US012715943B2

(12) United States Patent
Kawabe et al.

(10) Patent No.: US 12,715,943 B2
(45) Date of Patent: *Aug. 25, 2026

(54) POLYFUNCTIONAL VINYL AROMATIC COPOLYMER AND METHOD FOR MANUFACTURING SAME, COPOLYMER RUBBER OBTAINED THEREFROM, RUBBER COMPOSITION, RUBBER CROSSLINKED MATERIAL, AND TIRE MEMBER

(71) Applicant: NIPPON STEEL CHEMICAL & MATERIAL CO., LTD., Tokyo (JP)

(72) Inventors: Masanao Kawabe, Tokyo (JP); Tadashi Kuratomi, Tokyo (JP); Shinichi Iwashita, Tokyo (JP)

(73) Assignee: NIPPON STEEL Chemical & Material Co., Ltd., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 18/395,989

(22) Filed: Dec. 26, 2023

(65) Prior Publication Data

US 2024/0124629 A1 Apr. 18, 2024

Related U.S. Application Data

(63) Continuation of application No. 17/277,074, filed as application No. PCT/JP2019/037953 on Sep. 26, 2019, now Pat. No. 12,037,427.

(30) Foreign Application Priority Data

Sep. 28, 2018 (JP) ................................ 2018-184931
Nov. 6, 2018 (JP) ................................ 2018-208849
Mar. 29, 2019 (JP) ................................ 2019-067111

(51) Int. Cl.
*C08F 212/08* (2006.01)
*B60C 1/00* (2006.01)
(Continued)

(52) U.S. Cl.
CPC ............. *C08F 212/08* (2013.01); *B60C 1/00* (2013.01); *C08F 2/06* (2013.01); *C08F 2/44* (2013.01);
(Continued)

(58) Field of Classification Search
CPC .. C08F 212/08; C08F 2/06; C08F 8/42; C08F 212/12; C08F 212/36; C08F 232/08; C08F 236/10; C08F 257/02; C08F 210/14; C08F 212/32; C08F 255/08; C08F 289/00; C08F 277/00; C08F 2/44; C08F 212/02; C08F 212/34; C08F 257/00; C08K 3/22; C08K 3/013; C08K 3/04; C08K 3/36;
(Continued)

(56) References Cited

U.S. PATENT DOCUMENTS 12,037,427 B2 * 7/2024 Kawabe ................ C08F 212/34
2002/0120069 A1 8/2002 Li et al.
2003/0125467 A1 7/2003 Akema et al.

FOREIGN PATENT DOCUMENTS

JP 2003-073434 A 3/2003
JP 2004-123873 A 4/2004
(Continued)

OTHER PUBLICATIONS

Machine English translation of JP 2004-123873, Kawabe, Apr. 2004.*

(Continued)

*Primary Examiner* — Patrick D Niland

(74) *Attorney, Agent, or Firm* — Troutman Pepper Locke LLP; James E. Armstrong, IV

(57) ABSTRACT

Provided is a polyfunctional vinyl aromatic copolymer having reactivity and solubility that can be used for manufacturing a copolymer rubber and a copolymer rubber material having processability, strength and homogeneity obtained therefrom. The polyfunctional vinyl aromatic copolymer includes: 0.5 mol % or more and 40 mol % or less of a structural unit (a) derived from a divinyl aromatic compound and 60 mol % or more and 99.5 mol % or less of a structural unit (b) derived from a monovinyl aromatic compound, in which at least some of the structural units (a) are a crosslinked structural unit (a2) represented by the following Formula (2) and a vinyl-group-containing structural unit (a1) represented by the following Formula (1):

(2)

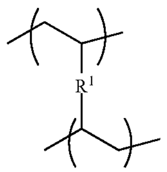

(1)

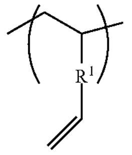

in the formulas, $R^1$'s independently represent an aromatic hydrocarbon group having 6 to 30 carbon atoms.

12 Claims, No Drawings

(51) Int. Cl.

| | |
|---|---|
| ***C08F 2/06*** | (2006.01) |
| ***C08F 2/44*** | (2006.01) |
| ***C08F 8/42*** | (2006.01) |
| ***C08F 210/14*** | (2006.01) |
| ***C08F 212/02*** | (2006.01) |
| ***C08F 212/12*** | (2006.01) |
| ***C08F 212/32*** | (2006.01) |
| ***C08F 212/34*** | (2006.01) |
| ***C08F 212/36*** | (2006.01) |
| ***C08F 232/08*** | (2006.01) |
| ***C08F 236/10*** | (2006.01) |
| ***C08F 255/08*** | (2006.01) |
| ***C08F 257/00*** | (2006.01) |
| ***C08F 257/02*** | (2006.01) |
| ***C08F 277/00*** | (2006.01) |
| ***C08F 289/00*** | (2006.01) |
| ***C08K 3/013*** | (2018.01) |
| ***C08K 3/22*** | (2006.01) |
| ***C08K 3/36*** | (2006.01) |
| ***C08L 25/04*** | (2006.01) |
| ***C08L 51/00*** | (2006.01) |
| ***C08L 51/06*** | (2006.01) |
| *C08K 3/04* | (2006.01) |

(52) U.S. Cl.

CPC .............. *C08F 8/42* (2013.01); *C08F 210/14* (2013.01); *C08F 212/02* (2013.01); *C08F 212/12* (2013.01); *C08F 212/32* (2013.01); *C08F 212/34* (2013.01); *C08F 212/36* (2013.01); *C08F 232/08* (2013.01); *C08F 236/10* (2013.01); *C08F 255/08* (2013.01); *C08F 257/00* (2013.01); *C08F 257/02* (2013.01); *C08F 277/00* (2013.01); *C08F 289/00* (2013.01); *C08K 3/013* (2018.01); *C08K 3/22* (2013.01); *C08K 3/36* (2013.01); *C08L 25/04* (2013.01); *C08L 51/003* (2013.01); *C08L 51/06* (2013.01); *C08K 3/04* (2013.01); *C08K 2003/2296* (2013.01); *Y02T 10/86* (2013.01)

(58) Field of Classification Search

CPC ............ C08K 2003/2296; C08L 25/04; C08L 51/003; C08L 51/06; B60C 1/00; Y02T 10/86

See application file for complete search history.

(56) References Cited

FOREIGN PATENT DOCUMENTS

| | | | |
|---|---|---|---|
| JP | 2004-517202 | A | 6/2004 |
| JP | 2005-213381 | A | 8/2005 |
| JP | 2007-332273 | A | 12/2007 |
| JP | 2008-239781 | A | 10/2008 |
| JP | 2010-209279 | A | 9/2010 |
| JP | 2015-193696 | A | 11/2015 |
| JP | 2018-039995 | A | 3/2018 |
| WO | 02/000779 | A1 | 1/2002 |
| WO | 2018/084128 | A1 | 5/2018 |
| WO | 18/181842 | A1 | 10/2018 |

OTHER PUBLICATIONS

Machine English translation of JP 2008-239781, Kawabe et al., Oct. 2008.*

Odian, George, Principles of Polymerization, Third Ed., John Wiley & Sons, Inc., 1991, pp. 19-24.*

International Search Report mailed Dec. 10, 2019, issued for PCT/JP2019/037953.

Machine English translation JP 2008-239781, Kawabe et al.

Machine English translation JP 2004-123873, Kawabe.

* cited by examiner

POLYFUNCTIONAL VINYL AROMATIC COPOLYMER AND METHOD FOR MANUFACTURING SAME, COPOLYMER RUBBER OBTAINED THEREFROM, RUBBER COMPOSITION, RUBBER CROSSLINKED MATERIAL, AND TIRE MEMBER

CROSS-REFERENCE TO RELATED APPLICATIONS

This Application is a Continuation of application Ser. No. 17/277,074 filed on Mar. 17, 2021. Application PCT/JP2019/037953 claims priority from Application 2019-067111 filed on Mar. 29, 2019 in Japan. Application PCT/JP2019/037953 claims priority from Application 2018-208849 filed on Nov. 6, 2018 in Japan. Application PCT/JP2019/037953 claims priority from Application 2018-184931 filed on Sep. 28, 2018 in Japan. The entire contents of these applications are incorporated herein by reference in their entirety.

TECHNICAL FIELD

The present invention particularly relates to a polyfunctional vinyl aromatic copolymer having excellent copolymerization reactivity with a conjugated diene compound (B) and an aromatic vinyl compound (C) in the presence of an anionic polymerization initiator and a method for manufacturing the same, and a conjugated diene copolymer having excellent processability and excellent tensile strength and wear resistance and a conjugated diene copolymer composition composed of the conjugated diene copolymer and a rubber crosslinked material obtained by crosslinking the same, and a tire member.

BACKGROUND ART

Conjugated diene rubbers such as styrene-butadiene rubber (SBR), butadiene rubber (BR), isoprene rubber (IR), and styrene-isoprene rubber have excellent wear resistance, elasticity, and water resistance, and are used in various applications such as a molding material and a resin modifier.

One of main applications of this conjugated diene rubber is an automobile tire. Characteristics required for a tire include mechanical strength, wear resistance, wet grip performance and the like (hereinafter also referred to as strength and the like). In addition, in recent years, tires (so-called “eco-tires”) having excellent energy-saving performance, that is, low fuel consumption, have been actively developed. These eco-tires are required to have low rolling resistance in addition to strength and the like.

It is known that, in order to secure strength and the like for a tire, a filler (reinforcing filling agent) such as carbon black or silica is added to the conjugated diene rubber. However, a terminal-modified solution polymerized SBR (terminal-modified S-SBR) has been focused on as a material for further improving strength and the like of the tire and imparting excellent rolling resistance. The terminal-modified S-SBR has a functional group at the molecular ends of the SBR and the functional groups at the molecular ends interacts with the filler. Due to this interaction, the dispersibility of the filler in the SBR is improved, the molecular ends of the SBR are constrained and the movability decreases. As a result, the hysteresis loss (internal friction) of the tire is reduced, and the rolling resistance is reduced. Taking advantage of this characteristic, eco-tires having both strength and the like and low rolling resistance are being developed.

For example, in PTL 1, an organolithium compound is used as an initiator in a non-polar solvent, a block copolymer composed of an α-methylstyrene block and a butadiene block is synthesized by living anion polymerization, and as necessary, a polyfunctional coupling agent is additionally reacted to obtain an S-SBR having both high temperature characteristics and rubber-like characteristics.

PTL 2 discloses a star-block interpolymer having a random copolymer block of a conjugated diene and a monovinyl aromatic monomer, a polyconjugated diene block, and a functional group derived from a polyfunctional lithium initiator, and discloses that it can be widely used as a rubber in production of tire treads having excellent characteristics such as reduction in rolling resistance and improvement in traction characteristics.

In PTL 1 and 2, it is thought that, when a branched structure is introduced into a rubber component, there is an effect of securing processability of the rubber. However, there is no particular measure for the interaction with the filler for securing strength, and the contribution to strength is not sufficient.

PTL 3 discloses a rubber composition obtained by adding a low-molecular-weight and functional group-containing polymer having a functional group that interacts with carbon black at the molecular chain terminal and having a polymer structure similar to a rubber component of a diene rubber to a rubber composition obtained by adding a predetermined amount of carbon black to a blended rubber containing a plurality of diene rubbers. In the rubber composition, when a low-molecular-weight compound that interacts with carbon black is added to a rubber, the amount of carbon black distributed into each diene rubber component can be controlled. Therefore, characteristics of each rubber component can be effectively exhibited, such as for example, it being possible to achieve having two rubber characteristics which are in a trade-off relationship, such as both rolling characteristics and wet characteristics. However, this technology is not sufficient for contributing to strength because the low-molecular-weight compound is added to a rubber.

PTL 4 discloses a rubber composition including crosslinked rubber particles containing a conjugated diene monomer unit, an aromatic vinyl monomer unit and a monomer unit having at least two polymerizable unsaturated groups and a conjugated diene/aromatic vinyl copolymer rubber containing a conjugated diene monomer unit having a specific bond structure, and discloses that the crosslinked rubber particles may contain a monomer unit having a carboxylic acid group, a hydroxyl group and/or an epoxy group. Since this technology provides an appropriate interaction with an inorganic filling agent (filler) such as silica, the inorganic filling agent has excellent dispersibility and processability. However, the substances disclosed as a monomer unit having at least two polymerizable unsaturated groups or a monomer unit having a carboxylic acid group, a hydroxyl group and/or an epoxy group are all small molecules. Therefore, the reactivity is excessively strong, and gelation may proceed in the crosslinked rubber particles and the rubber composition. In addition, in this technology, it is necessary to synthesize a crosslinked rubber separately from the conjugated diene/aromatic vinyl copolymer rubber and then add the crosslinked rubber to the conjugated diene/aromatic vinyl copolymer rubber, and thus improvement is necessary in order to simplify the process.

Here, in view of the above circumstances, the applicants found that, when a specific polyfunctional vinyl aromatic copolymer compound having a branched structure and a function of interacting with a filler is used as a structural unit of a conjugated diene rubber, it is possible to provide a copolymer rubber having both processability, strength and homogeneity (PTL 5).

However, in the polyfunctional vinyl aromatic copolymer compound, although gelation is significantly improved, there is still a problem of a small amount of a microgel being formed as a by-product.

Here, the applicants have disclosed PTL 6 and 7 and the like regarding compounds similar to the polyfunctional vinyl aromatic copolymer compound disclosed in PTL 5. However, use of these similar compounds as structural units of a copolymer rubber is not indicated.

In addition, since the polyfunctional vinyl aromatic copolymer disclosed in PTL 8 is a copolymer having a wide molecular weight distribution containing a large amount of high-molecular-weight components having a significantly developed branched structure, when it is used as a structural unit of a copolymer rubber, there is a problem of a small amount of a microgel being formed as a by-product.

CITATION LIST

Patent Literature

[PTL 1] Japanese Patent Application Publication No. 2003-73434

[PTL 2] Japanese Translation of PCT Application No. 2004-517202

[PTL 3] Japanese Patent Application Publication No. 2005-213381

[PTL 4] WO 2002/000779

[PTL 5] WO 2018/084128

[PTL 6] Japanese Patent Application Publication No. 2004-123873

[PTL 7] Japanese Patent Application Publication No. 2018-39995

[PTL 8] WO 2018/181842

SUMMARY OF INVENTION

In order to address such problems, the present invention provides a polyfunctional vinyl aromatic copolymer having reactivity and solubility that can be used for producing a copolymer rubber and a copolymer rubber material having processability, strength and homogeneity without formation of a small amount of a microgel as a by-product.

The inventors conducted extensive studies and as a result, found that, as a first invention, a polyfunctional vinyl aromatic copolymer including a structural unit (a) derived from a divinyl aromatic compound, a structural unit (b) derived from a monovinyl aromatic compound, and a structural unit (c) derived from a cycloolefin-based monomer having an aromatic condensed ring structure has high reactivity when a copolymer rubber is produced, and when the polyfunctional vinyl aromatic copolymer is used as a structural unit of a conjugated diene rubber, the above problems can be addressed, and completed the present invention.

The first invention provides a polyfunctional vinyl aromatic copolymer including: 5 mol % or more and 35 mol % or less of a structural unit (a) derived from a divinyl aromatic compound, 5 mol % or more and 25 mol % or less of a structural unit (b) derived from a monovinyl aromatic compound, and 40 mol % or more and 90 mol % or less of a structural unit (c) derived from a cycloolefin-based monomer having an aromatic condensed ring structure, in which at least some of the structural units (a) are a vinyl-group-containing structural unit (a1) represented by the following Formula (1):

[Chem. 1]

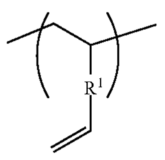

(1)

(in the formula, R1 represents an aromatic hydrocarbon group having 6 to 30 carbon atoms.)

wherein the molar fraction of the vinyl-group-containing structural unit (a1) with respect to the total amount of the structural units (a), (b) and (c) is within a range of 0.01 to 0.30.

The polyfunctional vinyl aromatic copolymer has a number average molecular weight Mn of 300 to 100,000, a molecular weight distribution (Mw/Mn) of 10.0 or less represented by the ratio of the weight average molecular weight Mw to the number average molecular weight Mn, and is soluble in toluene, xylene, tetrahydrofuran, dichloroethane or chloroform.

Regarding the cycloolefin-based monomer, at least one monomer selected from the group consisting of indene compounds, acenaphthylene compounds, benzofuran compounds, and benzothiophene compounds may be exemplified.

In addition, the present invention provides a method for manufacturing the polyfunctional vinyl aromatic copolymer, wherein polymerization raw materials including a divinyl aromatic compound, a monovinyl aromatic compound and a cycloolefin-based monomer having an aromatic condensed ring structure are polymerized in a homogeneous solvent containing the polymerization raw materials that includes the divinyl aromatic compound, monovinyl aromatic compound and cycloolefin-based monomer dissolved in a solvent with a dielectric constant of 2.0 to 15.0 at a temperature of 20° C. to 120° C. in the presence of a Lewis acid catalyst.

In addition, the present invention provides a conjugated diene copolymer obtained by copolymerizing the polyfunctional vinyl aromatic copolymer (A) with a conjugated diene compound (B) or with a conjugated diene compound (B) and an aromatic vinyl compound (C).

The conjugated diene copolymer may include 0.001 to 6 weight % of a structural unit (A1) derived from the polyfunctional vinyl aromatic copolymer, 29 to 99.999 weight % of a structural unit (B1) derived from the conjugated diene compound, and 0 to 70 weight % of a structural unit (C1) derived from the aromatic vinyl compound. In addition, a polymerization active terminal of the conjugated diene copolymer may be additionally reacted with a modifying agent.

In addition, the present invention provides a conjugated diene copolymer composition including 0.5 to 200 parts by weight of at least one reinforcing filling agent selected from the group consisting of silica inorganic filling agents, metal oxides, metal hydroxides and carbon black with respect to 100 parts by weight of the conjugated diene copolymer.

The conjugated diene copolymer composition may further include a cross-linking agent.

In addition, the present invention provides a rubber cross-linked material obtained by crosslinking the conjugated diene copolymer composition containing a cross-linking agent.

In addition, the present invention provides a tire member including the conjugated diene copolymer composition.

The inventors conducted extensive studies and as a result, found that, as a second invention, a polyfunctional vinyl aromatic copolymer including a structural unit (a) derived from a divinyl aromatic compound and a structural unit (b) derived from a monovinyl aromatic compound, and having a specific degree of crosslinking and molar fraction of a vinyl-group-containing structural unit and solubility has high reactivity when a copolymer rubber is produced, and when the polyfunctional vinyl aromatic copolymer is used as a structural unit of a conjugated diene rubber, the above problems can be addressed, and completed the present invention.

The second invention provides a polyfunctional vinyl aromatic copolymer, including 0.5 mol % or more and 40 mol % or less of a structural unit (a) derived from a divinyl aromatic compound and 60 mol % or more and 99.5 mol % or less of a structural unit (b) derived from a monovinyl aromatic compound, in which at least some of the structural units (a) are a crosslinked structural unit (a2) represented by the following Formula (2) and a vinyl-group-containing structural unit (a1) represented by the following Formula (1):

[Chem. 2]

(2)

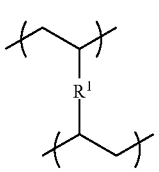

(1)

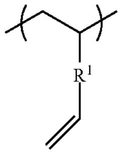

(in the formulas, $R^1$'s independently represent an aromatic hydrocarbon group having 6 to 30 carbon atoms.)

wherein the molar fraction of the crosslinked structural unit (a2) with respect to the structural unit (a) is within a range of 0.05 to 0.50, the molar fraction of the vinyl-group-containing structural unit (a1) with respect to the total amount of the structural units (a) and (b) is within a range of 0.001 to 0.35, the number average molecular weight Mn of the polyfunctional vinyl aromatic copolymer is 1,000 to 50,000, and the molecular weight distribution (Mw/Mn) represented by the ratio of the weight average molecular weight Mw to the number average molecular weight Mn is 8.0 or less.

When a sample prepared by dissolving 0.5 g of the polyfunctional vinyl aromatic copolymer in 100 g of toluene is put into a quartz cell, and the Haze (turbidity) thereof is measured using an integrating sphere type light transmittance measuring device using toluene as a reference sample, the Haze value may be 0.1 or less.

Regarding the monovinyl aromatic compound, at least one monomer selected from the group consisting of styrene, vinyl naphthalene, vinyl biphenyl, m-methylstyrene, p-methylstyrene, o,p-dimethylstyrene, m-ethylvinylbenzene, and p-ethylvinylbenzene may be exemplified.

In addition, the present invention provides a method for manufacturing the polyfunctional vinyl aromatic copolymer including polymerizing polymerization raw materials including a divinyl aromatic compound and a monovinyl aromatic compound in a homogeneous solvent containing the polymerization raw materials that includes the divinyl aromatic compound and monovinyl aromatic compound dissolved in a solvent with a dielectric constant of 2.0 to 15.0 at a temperature of 20° C. to 120° C. in the presence of a Lewis acid catalyst.

In addition, the present invention provides a conjugated diene copolymer obtained by copolymerizing the polyfunctional vinyl aromatic copolymer (A) with a conjugated diene compound (B) or with a conjugated diene compound (B) and an aromatic vinyl compound (C).

The conjugated diene copolymer may include 0.001 to 6 weight % of a structural unit (A1) derived from the polyfunctional vinyl aromatic copolymer, 29 to 99.999 weight % of a structural unit (B1) derived from the conjugated diene compound, and 0 to 70 weight % of a structural unit (C1) derived from the aromatic vinyl compound. In addition, a polymerization active terminal of the conjugated diene copolymer may be additionally reacted with a modifying agent.

In addition, the present invention provides a conjugated diene copolymer composition including 0.5 to 200 parts by weight of at least one reinforcing filling agent selected from the group consisting of silica inorganic filling agents, metal oxides, metal hydroxides and carbon black with respect to 100 parts by weight of the conjugated diene copolymer.

The conjugated diene copolymer composition may further include a cross-linking agent.

In addition, the present invention provides a rubber cross-linked material obtained by crosslinking the conjugated diene copolymer composition including the cross-linking agent.

In addition, the present invention provides a tire member including the conjugated diene copolymer composition.

The inventors conducted extensive studies and as a result, found that, as a third invention, a polyfunctional vinyl aromatic copolymer divinyl aromatic compound including a structural unit (a) derived from a divinyl aromatic compound, a structural unit (b) derived from a monovinyl aromatic compound having no substituent at the α position, and a structural unit (c) derived from an α,α-disubstituted olefin compound has high reactivity when a copolymer rubber is produced, and when the polyfunctional vinyl aromatic copolymer is used as a structural unit of a conjugated diene rubber, the above problem can be addressed, and completed the present invention.

The third invention provides a polyfunctional vinyl aromatic copolymer, including 0.5 mol % or more and 75 mol % or less of a structural unit (a) derived from a divinyl aromatic compound, 5.0 mol % or more and 75 mol % or less of a structural unit (b) derived from a monovinyl aromatic compound having no substituent at the α position, and 5.0 mol % or more and 75 mol % or less of a structural unit (c) derived from an α,α-disubstituted olefin compound, in which at least some of the structural units (a) are a crosslinked structural unit (a2) represented by the following Formula (2) and a vinyl-group-containing structural unit (a1) represented by the following Formula (1):

[Chem. 3]

(2)

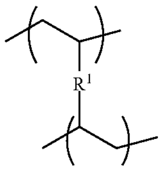

(1)

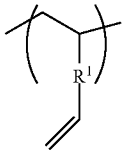

(in the formulas, $R^1$'s independently represent an aromatic hydrocarbon group having 6 to 30 carbon atoms.)

wherein the molar fraction of the crosslinked structural unit (a2) with respect to the structural unit (a) is within a range of 0.05 to 0.60, and the molar fraction of the vinyl-group-containing structural unit (a1) with respect to the total amount of the structural units (a), (b) and (c) is within a range of 0.001 to 60, and wherein the number average molecular weight Mn of the polyfunctional vinyl aromatic copolymer is 300 to 50,000, and the molecular weight distribution (Mw/Mn) represented by the ratio of the weight average molecular weight Mw to the number average molecular weight Mn is 10.0 or less.

The α,α-disubstituted olefin compound may be at least one monomer selected from the group consisting of isobutylene, diisobutylene, 2-methyl-1-butene, 2-methyl-1-pentene, 1-methyl-1-cyclopentene, 2-methyl-1-hexene, 1-methyl-1-cyclohexene, 2-methyl-1-heptene, 2-methyl-1-octene, 2-methyl-1-nonene, 2-methyl-1-decene, 2-methyl-1-dodecene, 2-methyl-1-tetradecene, 2-methyl-1-hexadecene, 2-methyl-1-octadecene, 2-methyl-1-eicosene, 2-methyl-1-docosene, 2-methyl-1-tetracosene, and α-methylstyrene.

The monovinyl aromatic compound having no substituent at the α position may be at least one monomer selected from the group consisting of styrene, vinyl naphthalene, vinyl biphenyl, m-methylstyrene, p-methylstyrene, o,p-dimethylstyrene, m-ethylvinylbenzene, and p-ethylvinylbenzene.

In addition, the present invention provides a method for manufacturing the polyfunctional vinyl aromatic copolymer including polymerizing polymerization raw materials including a divinyl aromatic compound, a monovinyl aromatic compound having no substituent at the α position, and an α,α-disubstituted olefin compound in a homogeneous solvent containing the polymerization raw materials that includes the divinyl aromatic compound, monovinyl aromatic compound having no substituent at the α position, and α,α-disubstituted olefin compound dissolved in a solvent with a dielectric constant of 2.0 to 15.0 at a temperature of 0° C. to 120° C. in the presence of a Lewis acid catalyst.

In addition, the present invention provides a conjugated diene copolymer obtained by copolymerizing the polyfunctional vinyl aromatic copolymer (A) with a conjugated diene compound (B) or with a conjugated diene compound (B) and an aromatic vinyl compound (C).

The conjugated diene copolymer may include 0.001 to 6 weight % of a structural unit (A1) derived from the polyfunctional vinyl aromatic copolymer, 29 to 99.999 weight % of a structural unit (B1) derived from the conjugated diene compound, and 0 to 70 weight % of a structural unit (C1) derived from the aromatic vinyl compound. In addition, a polymerization active terminal of the conjugated diene copolymer may be additionally reacted with a modifying agent.

The conjugated diene copolymer may include 0.5 to 200 parts by weight of at least one reinforcing filling agent selected from the group consisting of silica inorganic filling agents, metal oxides, metal hydroxides and carbon black with respect to 100 parts by weight of the conjugated diene copolymer.

The conjugated diene copolymer composition may further include a cross-linking agent.

In addition, the present invention provides a rubber cross-linked material obtained by crosslinking the conjugated diene copolymer composition containing a cross-linking agent.

In addition, the present invention provides a tire member including the conjugated diene copolymer composition.

Since the polyfunctional vinyl aromatic copolymer of the present invention has reactivity and solubility that can be used in production of a copolymer rubber, it is suitable as a raw material thereof. Since the conjugated diene copolymer of the present invention has a structural unit having a branched structure and a function of interacting with a filler, it is excellent as a rubber having both processability and strength. In addition, the copolymer is unlikely to form a gel-like substance and becomes homogeneous, and can be applied for molding materials, resin modifiers, and the like.

In addition, since the crosslinked rubber composition in which the conjugated diene copolymer contains a filler and is crosslinked has excellent dispersibility of the filler, it has excellent mechanical strength and wear resistance.

DESCRIPTION OF EMBODIMENTS

A polyfunctional vinyl aromatic copolymer of a first invention will be described.

The polyfunctional vinyl aromatic copolymer of the present invention includes a structural unit (a) derived from a divinyl aromatic compound, a structural unit (b) derived from a monovinyl aromatic compound, and a structural unit (c) derived from a cycloolefin-based monomer having an aromatic condensed ring structure.

Here, the number average molecular weight Mn is 300 to 100,000, and the molecular weight distribution (Mw/Mn) represented by the ratio of the weight average molecular weight Mw to the number average molecular weight Mn is 10.0 or less, and the copolymer that is soluble in toluene, xylene, tetrahydrofuran, dichloroethane or chloroform is preferable.

Since the polyfunctional vinyl aromatic copolymer of the present invention is preferably solvent-soluble, it is also referred to as a soluble polyfunctional vinyl aromatic copolymer, or simply a copolymer.

The structural unit referred to in this specification refers to a repeating unit present in the main chain of a copolymer.

The structural unit (a) derived from a divinyl aromatic compound may have several different structures such as a structure in which only one vinyl group is reacted or a structure in which two vinyl groups are reacted, and contains a vinyl-group-containing structural unit (a1) represented by Formula (1), which is a structural unit of a structure in which only one vinyl group is reacted within a range of 0.01 to 0.30 in terms of molar fraction.

The lower limit is preferably 0.04, and more preferably 0.05. In addition, the upper limit is preferably 0.25, and more preferably 0.20. Within the above range, it is possible to obtain a copolymer rubber having excellent reactivity, excellent compatibility with a diene rubber, and excellent processability, tensile strength, and wear resistance during copolymerization with a conjugated diene compound while maintaining solubility. When the molar fraction is less than 0.01, the copolymerization reactivity with a conjugated diene compound and the like tends to decrease, and when the molar fraction is larger than 0.30, a microgel tends to be formed during copolymerization.

Here, the molar fraction is a molar fraction of the vinyl-group-containing structural unit (a1) with respect to the total amount of the structural units (a), (b) and (c), and is calculated by the following Formula (12).

$$(a1)/[(a)+(b)+(c)] \quad (12)$$

Here, (a), (b), (c) and (a1) represent an amount (mol) of the structural units (a), (b), (c) and (a1), respectively.

The polyfunctional vinyl aromatic copolymer of the present invention preferably contains 5 to 35 mol % of the structural unit (a) derived from a divinyl aromatic compound.

When the structural units are composed of only the structural units (a), (b) and (c), the molar fraction of the structural unit (a) with respect to the total amount of the structural units (a), (b) and (c) is 0.05 to 0.35. The molar fraction is calculated by the following Formula (13).

$$(a)/[(a)+(b)+(c)] \quad (13)$$

(Here, (a), (b), and (c) are the same as those in Formula (2).)

The lower limit of the molar fraction is preferably 0.06, and more preferably 0.07. In addition, the upper limit is preferably 0.30, and more preferably 0.25.

Here, when a structural unit other than the structural units (a), (b) and (c) is included, the lower limit is preferably 0.02, more preferably 0.05, and still more preferably 0.07. In addition, the upper limit is preferably 0.35, more preferably 0.30, and still more preferably 0.25.

On the other hand, the molar fraction of the structural unit (b) derived from a monovinyl aromatic compound is 0.05 to 0.25. The lower limit is preferably 0.07. In addition, the upper limit is preferably 0.23, and more preferably 0.20.

The molar fraction of the structural unit (c) derived from the cycloolefin-based monomer is 0.40 to 0.90, and the lower limit is preferably 0.45, more preferably 0.50, and still more preferably 0.65. In addition, the upper limit is preferably 0.86, and more preferably 0.80.

When the structural units are composed of only the structural units (a), (b) and (c), the molar fraction of the structural unit (b) is calculated by the following Formula (14), and the molar fraction of the structural unit (c) is calculated by the following Formula (15).

$$(b)/[(a)+(b)+(c)] \quad (14)$$

$$(c)/[(a)+(b)+(c)] \quad (15)$$

(Here, (a), (b), and (c) are the same as those in Formula (12).)

Here, even when a structural unit other than the structural units (a), (b) and (c) is included, a preferable molar fraction of the structural unit (b) or the structural unit (c) is within the above range.

The structural unit (a) derived from a divinyl aromatic compound includes a vinyl group as a branching component for exhibiting the copolymerization reactivity with the conjugated diene compound, and on the other hand, since the structural unit (b) derived from a monovinyl aromatic compound does not include a vinyl group involved in the curing reaction, it imparts the moldability, compatibility, and the like. In addition, the structural unit (c) derived from a cycloolefin-based monomer provides reactivity, ease of gel formation, and compatibility because the amount thereof that is introduced influences the molecular weight and molecular weight distribution of the polyfunctional vinyl aromatic copolymer. Therefore, when the molar fraction of the structural unit (a) is less than 0.05, the heat resistance of the cured product is insufficient, and when the molar fraction exceeds 0.35, the molding processability deteriorates. In addition, when the molar fraction of the structural unit (b) exceeds 0.25, the heat resistance decreases, and when the molar fraction is less than 0.05, the molding processability deteriorates. On the other hand, when the molar fraction of the structural unit (c) exceeds 0.90, the heat resistance decreases, and when the molar fraction is less than 0.40, the molding processability deteriorates.

The Mn (number average molecular weight in terms of standard polystyrene measured using gel permeation chromatography) of the polyfunctional vinyl aromatic copolymer of the present invention is preferably 300 to 100,000, more preferably 400 to 50,000, and still more preferably 500 to 10,000. When the Mn is less than 300, since the amount of the monofunctional copolymer contained in the copolymer increases, the copolymerization reactivity with the conjugated diene compound tends to decrease, and when the Mn exceeds 100,000, a gel is likely to be formed, and the molding processability and the tensile elongation at break tend to decrease. The value of the molecular weight distribution (Mw/Mn) is preferably 10.0 or less, more preferably 8.0 or less, more preferably 1.0 to 7.0, and most preferably 1.3 to 6.0. When the Mw/Mn exceeds 10.0, the processing characteristics of the copolymer rubber tend to deteriorate, and a gel tends to be formed.

The soluble polyfunctional vinyl aromatic copolymer of the present invention is soluble in a solvent selected from among toluene, xylene, tetrahydrofuran, dichloroethane and chloroform, but it is advantageously soluble in any of the above solvents. In order to obtain a solvent-soluble and polyfunctional copolymer, it is necessary for some of vinyl groups of divinylbenzene to remain without crosslinking to achieve an appropriate degree of branching. Such a copolymer and its manufacturing method are known in the above patent literature and the like. Then, 50 g or more of the copolymer is preferably dissolved in 100 g of a solvent, and 80 g or more thereof is more preferably dissolved.

A polyfunctional vinyl aromatic copolymer of a second invention will be described.

The polyfunctional vinyl aromatic copolymer of the present invention includes the structural unit (a) derived from a divinyl aromatic compound and the structural unit (b) derived from a monovinyl aromatic compound.

Then, at least some of the structural units (a) include the crosslinked structural unit (a2) represented by Formula (2) and the vinyl-group-containing structural unit (a1) represented by Formula (1).

The molar fraction (also referred to as a degree of crosslinking) indicating the ratio of the crosslinked structural unit (a2) derived from a divinyl aromatic compound with respect to the structural unit (a) is within a range of 0.05 to 0.50. In addition, the molar fraction of the vinyl-groupcontaining structural unit (a1) with respect to the total amount of the structural units (a) and (b) is within a range of 0.001 to 0.35.

The degree of crosslinking of the crosslinked structural unit (a2) is within a range of 0.05 to 0.50, and a preferable lower limit is 0.06, and more preferably 0.07. In addition, the upper limit is preferably 0.45, more preferably 0.40, particularly preferably 0.35, and most preferably 0.30. Within the above range, it is possible to obtain a copolymer rubber having excellent reactivity, excellent compatibility with a diene rubber, and excellent processability, tensile strength, and wear resistance during copolymerization with a conjugated diene compound while maintaining solubility. According to the method for manufacturing the polyfunctional vinyl aromatic copolymer of the present invention, the degree of crosslinking and the vinyl-group-containing structural unit (a1) represented by Formula (1) to be described below are parameters that can be independently and arbitrarily controlled and changed. However, when the degree of crosslinking is less than 0.05, the degree of crosslinking of the polyfunctional vinyl aromatic copolymer is low, and thus a crosslinking reaction in molecules of the vinyl-group-containing structural unit (a1) represented by Formula (1) is likely to occur, and a microgel tends to be formed during copolymerization with a conjugated diene compound and the like. On the other hand, when the degree of crosslinking is larger than 0.50, since the molecular weight of the polyfunctional vinyl aromatic copolymer itself tends to increase, and the molecular weight distribution tends to be widened, the wear resistance tends to decrease.

The structural unit (a) derived from a divinyl aromatic compound may have several different structures such as a structure in which only one vinyl group is reacted or a structure in which two vinyl groups are reacted, and contains a vinyl-group-containing structural unit (a1) represented by Formula (1), which is a structural unit of a structure in which only one vinyl group is reacted within a range of 0.001 to 0.35 in terms of molar fraction.

The lower limit is preferably 0.005, and more preferably, 0.01. In addition, the upper limit is preferably 0.30, and more preferably 0.20. Within the above range, it is possible to obtain a copolymer rubber having excellent reactivity, excellent compatibility with a diene rubber, and excellent processability, tensile strength, and wear resistance during copolymerization with a conjugated diene compound while maintaining solubility. When the molar fraction is less than 0.001, the copolymerization reactivity with a conjugated diene compound and the like tends to decrease, and when the molar fraction is larger than 0.35, a microgel tends to be formed during copolymerization.

Here, the molar fraction is a molar fraction of the vinyl-group-containing structural unit (a1) with respect to the total amount of the structural units (a) and (b) and is calculated by the following Formula (23).

$$(a1)/[(a)+(b)] \tag{23}$$

Here, (a), (b) and (a1) represent an amount (mol) of the structural units (a), (b) and (a1), respectively.

The polyfunctional vinyl aromatic copolymer of the present invention contains 0.5 to 40 mol % of the structural unit (a) derived from a divinyl aromatic compound.

When the structural unit is composed of only the structural units (a) and (b), the molar fraction of the structural unit (a) with respect to the total amount of the structural units (a) and (b) is 0.005 to 0.40. The molar fraction is calculated by the following Formula (24).

$$(a)/[(a)+(b)] \tag{24}$$

(Here, (a) and (b) are the same as those in Formula (23).)

The lower limit of the molar fraction is preferably 0.006, and more preferably 0.007. In addition, the upper limit is preferably 0.30, and more preferably 0.25.

Here, when a structural unit other than the structural units (a) and (b) is included, the lower limit of the content is preferably 0.2 mol %, more preferably 0.5 mol %, and still more preferably 0.7 mol %. In addition, the upper limit is preferably 35 mol %, more preferably 30 mol %, and still more preferably 25 mol %.

On the other hand, the molar fraction of the structural unit (b) derived from a monovinyl aromatic compound is 0.60 to 0.995. The lower limit is preferably 0.70. The lower limit is more preferably 0.75. In addition, the upper limit is preferably 0.994, and more preferably 0.993.

When the structural units are composed of only the structural units (a) and (b), the molar fraction of the structural unit (b) is calculated by the following Formula (25).

$$(b)/[(a)+(b)] \tag{25}$$

(Here, (a) and (b) are the same as those in Formula (23).)

Here, even when a structural unit other than the structural units (a) and (b) is included, a preferable molar fraction of the structural unit (b) is within the above range.

The structural unit (a) derived from a divinyl aromatic compound includes a vinyl group as a branching component for exhibiting the copolymerization reactivity with the conjugated diene compound, and on the other hand, the structural unit (b) derived from a monovinyl aromatic compound does not include a vinyl group involved in the curing reaction, it imparts the moldability, compatibility, and the like. Therefore, when the molar fraction of the structural unit (a) is less than 0.005, the heat resistance of the cured product is insufficient, and when the molar fraction exceeds 0.40, the molding processability deteriorates. In addition, when the molar fraction of the structural unit (b) exceeds 0.995, the heat resistance decreases, and when the molar fraction is less than 0.60, the molding processability deteriorates.

The polyfunctional vinyl aromatic copolymer of the present invention may contain other structural units in addition to the above structural units. Details of the other structural units are understood from the description of the manufacturing method.

The Mn (number average molecular weight in terms of standard polystyrene using gel permeation chromatography) of the polyfunctional vinyl aromatic copolymer of the present invention is 1,000 to 50,000, preferably 1,200 to 45,000, more preferably 1,400 to 30,000, still more preferably 1,600 to 20,000, and most preferably 2,000 to 10,000. When the Mn is less than 1,000, since the amount of the monofunctional copolymer contained in the copolymer increases, the copolymerization reactivity with the conjugated diene compound tends to decrease, and when the Mn exceeds 50,000, a gel is likely to be formed, and also the molding processability and the tensile elongation at break tend to decrease. The molecular weight distribution is 8.0 or less, preferably 7.0 or less, and more preferably 1.3 to 6.0. When the Mw/Mn exceeds 8.0, the processing characteristics of the copolymer rubber tend to deteriorate, and also a gel tends to be formed.

The polyfunctional vinyl aromatic copolymer of the present invention is soluble in a solvent selected from among toluene, xylene, tetrahydrofuran, dichloroethane and chloroform, but it is advantageously soluble in any of the above solvents. In order to obtain a solvent-soluble and polyfunctional copolymer, it is necessary that some of vinyl groups of divinylbenzene remaining without crosslinking to achieve an appropriate degree of branching. Such a copolymer and its manufacturing method are known in the above patent literature and the like. Then, 50 g or more of the copolymer is preferably dissolved in 100 g of a solvent, and 80 g or more thereof is more preferably dissolved.

In the polyfunctional vinyl aromatic copolymer of the present invention, the Haze value (turbidity) in this toluene solution is preferably 0.1 or less. Here, the Haze value is a Haze value that is measured by an integrating sphere type light transmittance measuring device using toluene as a reference sample when a solution prepared by dissolving 0.5 g of a polyfunctional vinyl aromatic copolymer in 100 g of toluene is put into a quartz cell.

The Haze value is also related to evaluation of solubility in the solvent, and a lower Haze value indicates better solubility or a smaller amount of a gel.

A polyfunctional vinyl aromatic copolymer of a third invention will be described.

The polyfunctional vinyl aromatic copolymer of the present invention includes the structural unit (a) derived from a divinyl aromatic compound, the structural unit (b) derived from a monovinyl aromatic compound having no substituent at the α position, and the structural unit (c) derived from an α,α-disubstituted olefin compound.

Then, at least some of the structural units (a) include the crosslinked structural unit (a2) represented by Formula (2) and the vinyl-group-containing structural unit (a1) represented by Formula (1).

The molar fraction (also referred to as a degree of crosslinking) indicating the ratio of the crosslinked structural unit (a2) derived from a divinyl aromatic compound with respect to the structural unit (a) is within a range of 0.05 to 0.60. In addition, the molar fraction of the vinyl-group-containing structural unit (a1) with respect to the total amount of the structural units (a), (b) and (c) is within a range of 0.001 to 0.60.

The degree of crosslinking of the crosslinked structural unit (a2) is within a range of 0.05 to 0.60, but the lower limit is preferably 0.06, and more preferably 0.07. In addition, the upper limit is preferably 0.55, more preferably 0.50, particularly preferably 0.45, most preferably 0.40, and optimally within a range of 0.20 to 0.40. According to the method for manufacturing the polyfunctional vinyl aromatic copolymer of the present invention, the degree of crosslinking and the vinyl-group-containing structural unit (a1) represented by Formula (1) are parameters that can be independently and arbitrarily controlled and changed. However, when the degree of crosslinking of the crosslinked structural unit (a2) is less than 0.05, the degree of crosslinking of the polyfunctional vinyl aromatic copolymer is low, and thus a crosslinking reaction in molecules of the vinyl-group-containing structural unit (a1) represented by Formula (1) is likely to occur, and a microgel tends to be formed during copolymerization with a conjugated diene compound and the like. On the other hand, when the degree of crosslinking is larger than 0.60, since the molecular weight of the polyfunctional vinyl aromatic copolymer itself tends to increase, and the molecular weight distribution tends to be widened, the wear resistance tends to decrease.

The structural unit (a) derived from a divinyl aromatic compound may have several different structures such as a structure in which only one vinyl group is reacted or a structure in which two vinyl groups are reacted, and contains a vinyl-group-containing structural unit (a1) represented by Formula (1), which is a structural unit of a structure in which only one vinyl group is reacted within a range of 0.001 to 0.60 in terms of molar fraction.

The lower limit is preferably 0.005, and more preferably 0.01. In addition, the upper limit is preferably 0.55, and more preferably 0.50, and optimally within a range of 0.10 to 0.50. Within the above range, it is possible to obtain a copolymer rubber having excellent reactivity, excellent compatibility with a diene rubber, and excellent processability, tensile strength, and wear resistance during copolymerization with a conjugated diene compound while maintaining solubility. When the molar fraction is less than 0.001, the copolymerization reactivity with a conjugated diene compound and the like tends to decrease, and when the molar fraction is larger than 0.60, a microgel tends to be formed during copolymerization.

Here, the molar fraction is a molar fraction of the vinyl-group-containing structural unit (a1) with respect to the total amount of the structural units (a), (b) and (c), and is calculated by the following Formula (33).

$$(a1)/[(a)+(b)+(c)] \quad (33)$$

Here, (a), (b), (c) and (a1) represent an amount (mol) of the structural units (a), (b), (c) and (a1), respectively.

The polyfunctional vinyl aromatic copolymer of the present invention contains 0.5 to 60 mol % of the structural unit (a) derived from a divinyl aromatic compound.

When the structural units are composed of only the structural units (a), (b) and (c), the molar fraction of the structural unit (a) with respect to the total amount of the structural units (a), (b) and (c) is 0.005 to 0.75. The molar fraction is calculated by the following Formula (34).

$$(a)/[(a)+(b)+(c)] \quad (34)$$

(Here, (a), (b) and (c) are the same as those in Formula (33).)

The lower limit of the molar fraction is preferably 0.006, and more preferably 0.007. In addition, the upper limit is preferably 0.70, more preferably 0.60, and optimally 0.10 to 0.55.

Here, when a structural unit other than the structural units (a), (b) and (c) is included, the lower limit of the content is preferably 0.2 mol %, more preferably 0.5 mol %, and still more preferably 0.7 mol %. In addition, the upper limit is preferably 50 mol %, more preferably 45 mol %, and still more preferably 40 mol %.

The polyfunctional vinyl aromatic copolymer of the present invention contains 5.0 to 75 mol % of the structural unit (b) derived from a monovinyl aromatic compound having no substituent at the α position. In terms of molar fraction, it is 0.05 to 0.75. The lower limit is preferably 0.06. The lower limit is more preferably 0.07. In addition, the upper limit is preferably 0.70, more preferably 0.65, and optimally 0.30 to 0.60.

When the structural units are composed of only the structural units (a), (b) and (c), the molar fraction of the structural unit (b) is calculated by the following Formula (35).

$$(b)/[(a)+(b)+(c)] \quad (35)$$

(Here, (a), (b) and (c) are the same as those in Formula (33).)

Here, even when a structural unit other than the structural units (a), (b) and (c) is included, a preferable molar fraction of the structural unit (b) is within the above range.

The polyfunctional vinyl aromatic copolymer of the present invention contains 5.0 to 75 mol % of the structural unit (c) derived from an α,α-disubstituted olefin compound. In terms of molar fraction, it is 0.05 to 0.75. The lower limit is preferably 0.06. The lower limit is more preferably 0.07. In addition, the upper limit is preferably 0.70, more preferably 0.65, and optimally 0.10 to 0.40.

When the structural units are composed of only the structural units (a), (b) and (c), the molar fraction of the structural unit (c) is calculated by the following Formula (36).

$$(c)/[(a)+(b)+(c)] \quad (36)$$

(Here, (a), (b) and (c) are the same as those in Formula (33).)

Here, even when a structural unit other than the structural units (a), (b) and (c) is included, a preferable molar fraction of the structural unit (c) is within the above range.

The structural unit (a) derived from a divinyl aromatic compound includes a vinyl group as a branching component for exhibiting the copolymerization reactivity with the conjugated diene compound, and on the other hand, since the structural unit (b) derived from a monovinyl aromatic compound having no substituent at the α position does not include a vinyl group involved in the curing reaction, it imparts the moldability, compatibility, and the like. Since the structural unit (c) derived from an α,α-disubstituted olefin compound has a function of controlling the molecular weight because it easily causes a chain transfer reaction.

In addition, when the molar fraction of the structural unit (a) is less than 0.005, the heat resistance of the cured product is insufficient, and when the molar fraction exceeds 0.75, the molding processability deteriorates. In addition, when the molar fraction of the structural unit (b) exceeds 0.75, the heat resistance decreases, and when the molar fraction is less than 0.05, the molding processability deteriorates. On the other hand, when the molar fraction of the structural unit (c) exceeds 0.75, the heat resistance decreases, and when the molar fraction is less than 0.05, the molecular weight increases, and compatibility with another resin and the molding processability deteriorate.

The polyfunctional vinyl aromatic copolymer of the present invention may contain other structural units in addition to the above structural units. Details of the other structural units are understood from the description of the manufacturing method.

The Mn (number average molecular weight in terms of standard polystyrene measured using gel permeation chromatography) of the polyfunctional vinyl aromatic copolymer of the present invention is 300 to 50,000, preferably 500 to 45,000, more preferably 600 to 40,000, still more preferably 700 to 35,000, most preferably 800 to 30,000, and optimally 900 to 3,000. When the Mn is less than 300, since the amount of the monofunctional copolymer contained in the copolymer increases, the copolymerization reactivity with the conjugated diene compound tends to decrease, and when the Mn exceeds 50,000, a gel is likely to be formed, and also the molding processability and the tensile elongation at break tend to decrease. The molecular weight distribution is 10.0 or less, preferably 9.0 or less, more preferably 1.3 to 8.0, and optimally 2.0 to 6.0. When the Mw/Mn exceeds 10.0, the processing characteristics of the copolymer rubber tend to deteriorate, and also a gel tends to be formed.

The polyfunctional vinyl aromatic copolymer of the present invention is soluble in a solvent selected from among toluene, xylene, tetrahydrofuran, dichloroethane and chloroform, but it is advantageously soluble in any of the above solvents. In order to obtain a solvent-soluble and polyfunctional copolymer, it is necessary that some of vinyl groups of divinylbenzene remaining without crosslinking to achieve an appropriate degree of branching. Such a copolymer and its manufacturing method are known in the above patent literature and the like. Then, 50 g or more of the copolymer is preferably dissolved in 100 g of a solvent, and 80 g or more thereof is more preferably dissolved.

Next, a method for manufacturing the polyfunctional vinyl aromatic copolymer of the first, second, and third inventions will be described. According to this manufacturing method, the polyfunctional vinyl aromatic copolymer of the present invention can be advantageously manufactured.

In the manufacturing method of the present invention, polymerization raw materials including an essential component such as a divinyl aromatic compound and a monovinyl aromatic compound in a homogeneous solvent containing the polymerization raw materials dissolved in a solvent with a dielectric constant of 2.0 to 15.0 may be polymerized at a temperature of 20° C. to 60° C. in the presence of a Lewis acid catalyst.

The divinyl aromatic compound causes the copolymer to branch and makes it polyfunctional and has an important role as a crosslinking component for forming a branch when the copolymer is copolymerized with the conjugated diene compound. Regarding examples of divinyl aromatic compounds, divinylbenzene (including each isomer), divinyl naphthalene (including each isomer), and divinyl biphenyl (including each isomer) are preferably used, but the present invention is not limited thereto. In addition, these may be used alone or two or more thereof may be used in combination. In consideration of molding processability, divinylbenzene (m-form, p-form or an isomer mixture thereof) is more preferable.

The monovinyl aromatic compound improves solvent solubility, compatibility, and processability of the copolymer.

Examples of monovinyl aromatic compounds include vinyl aromatic compounds such as styrene, vinyl naphthalene, and vinyl biphenyl; and nuclear alkyl-substituted vinyl aromatic compounds such as o-methylstyrene, m-methylstyrene, p-methylstyrene, o,p-dimethylstyrene, o-ethyl vinyl benzene, m-ethylvinylbenzene, and p-ethylvinylbenzene, but the present invention is not limited thereto. In order to prevent gelation of the copolymer, and improve the solubility in the solvent, compatibility, and processability, styrene, ethyl vinyl benzene (including each isomer), ethyl vinyl biphenyl(including each isomer), and ethyl vinyl naphthalene (including each isomer) are particularly preferably used in consideration of cost and ease of availability. In consideration of compatibility and cost, styrene and ethyl vinyl benzene (m-form, p-form or an isomer mixture thereof) are more preferable.

A compound having no substituent at the α position is preferable.

In the first invention, the cycloolefin-based monomer has an aromatic condensed ring structure, which also functions as a chain transfer agent, and controls the molecular weight and the molecular weight distribution of the copolymer during polymerization, and thus improves the solvent solubility and processability while maintaining excellent dielectric characteristics of a hydrocarbon resin material.

The cycloolefin-based monomer may be a monomer composed of an aromatic ring and a cycloolefin ring condensed thereto, and the cycloolefin ring may have a cationically polymerizable unsaturated bond, and may have hetero atoms such as oxygen atoms or sulfur atoms as ring-constituting atoms. In addition, the aromatic ring and the cycloolefin ring may have a substituent such as an alkyl group, an alkoxy group, or an acyl group.

Examples of preferable cycloolefin-based monomers include monomers selected from the group consisting of indene compounds, acenaphthylene compounds, benzofuran compounds, and benzothiophene compounds.

Examples of indene compounds include at least one compound selected from the group consisting of indene, alkyl indenes, halogenated indenes, aryl indenes, alkoxy indenes, alkoxycarbonyl indenes, acyloxyalkyl indenes, alkylsilyl indenes and alkylstannyl indenes.

Examples of acenaphthylene compounds include at least one compound selected from the group consisting of acenaphthylene, alkyl acenaftylenes, halogenated acenaphthylenes, aryl acenaphthylenes, alkoxy acenaphthylenes, alkoxycarbonyl acenaphthylenes, acyloxy acenaphthylenes, alkylsilylasenaftylenes and alkylstannyl asenaftylenes.

Benzofuran compounds and benzothiophene compounds may include benzofurans and benzothiophenes modified with the same substituent as in the indene compounds and acenaphthylene compounds in addition to benzofuran and benzothiophene. In addition, the benzofuran compound may be 1-benzofuran or 2-benzofuran. The same applies to benzothiophene.

The cycloolefin-based monomers specifically exemplified above may be used alone or two or more thereof may be used in combination. Among these cycloolefin-based monomers, indene compounds and acenaphthylene compounds are preferably used in consideration of ease of industrial availability, dielectric characteristics, and a strong molecular weight control effect of the copolymer of the present invention. In consideration of the copolymerization reactivity and a strong molecular weight control effect, indene is most preferably used.

In the third invention, the α,α-disubstituted olefin compound has a function of controlling the molecular weight of the copolymer, and thus improves the solvent solubility, compatibility, and processability. Examples of α,α-disubstituted olefin compounds include at least one monomer selected from the group consisting of isobutylene, diisobutylene, 2-methyl-1-butene, 2-methyl-1-pentene, 1-methyl-1-cyclopentene, 2-methyl-1-hexene, 1-methyl-1-cyclohexene, 2-methyl-1-heptene, 2-methyl-1-octene, 2-methyl-1-nonene, 2-methyl-1-decene, 2-methyl-1-dodecene, 2-methyl-1-tetradecene, 2-methyl-1-hexadecene, 2-methyl-1-octadecene, 2-methyl-1-eicosene, 2-methyl-1-docosene, 2-methyl-1-tetracosene, and α-methylstyrene, but the present invention is not limited thereto. In order to control the molecular weight and the molecular weight distribution of the copolymer, prevent formation of a gel, and improve the solubility in the solvent, compatibility, and processability, for an α,α-disubstituted olefin compound substituted with an aliphatic group, for example, isobutylene, diisobutylene, 2-methyl-1-pentene, 2-methyl-1-hexene, and isoprene, or an α,α-disubstituted olefin compound substituted with an aromatic group, α-methylstyrene can be preferably used in consideration of cost and ease of availability. In consideration of ease of manufacturing and cost, isobutylene, diisobutylene, and α-methylstyrene are more preferable.

In addition, in the method for manufacturing a copolymer of the present invention, as long as the effects of the present invention are not impaired, in addition to an essential component such as a divinyl aromatic compound and a monovinyl aromatic compound, other monomers such as trivinyl aromatic compounds, trivinyl aliphatic compounds, divinyl aliphatic compounds, and monovinyl aliphatic compounds are used, and a structural unit (e) derived from the other monomers can be introduced into the copolymer.

Preferable specific examples of other monomers include 1,3,5-trivinylbenzene, 1,3,5-trivinyl naphthalene, 1,2,4-trivinylcyclohexane, and ethylene glycol diacrylate, butadiene, but the present invention is not limited thereto. These may be used alone or two or more thereof may be used in combination. The amount of the other monomers used is preferably within a range of less than 30 mol % of all monomers. Therefore, the amount of the structural unit (e) derived from other monomers is within a range of less than 30 mol % of a total amount of the structural units in the copolymer.

In the method for manufacturing a copolymer of the present invention, monomers including an essential component such as a divinyl aromatic compound and a monovinyl aromatic compound, and additionally including other monomers as necessary are polymerized in the presence of a Lewis acid catalyst to produce a copolymer.

In the first invention, the proportion of each component used as a monomer is preferably within the following range with respect to a total of 100 mol % of the divinyl aromatic compound, the monovinyl aromatic compound, and the cycloolefin-based monomer.

Divinyl aromatic compound; 5 to 35 mol %, preferably 6 to 30 mol %, and more preferably 7 to 25 mol %.

Monovinyl aromatic compound; 5 to 25 mol %, preferably 6 to 23 mol %, and more preferably 7 to 20 mol %.

Cycloolefin-based monomer; 40 to 90 mol %, preferably 45 to 86 mol %, and more preferably 50 to 80 mol %.

In the second invention, the proportion of each component used as a monomer is preferably within the following range with respect to a total of 100 mol % of the divinyl aromatic compound and the monovinyl aromatic compound.

Divinyl aromatic compound; 0.2 to 45 mol %, preferably 0.3 to 40 mol %, and more preferably 0.4 to 35 mol %.

Monovinyl aromatic compound; 55 to 99.8 mol %, preferably 60 to 99.7 mol %, and more preferably 65 to 99.6 mol %.

In the third invention, the proportion of each component used as a monomer is preferably within the following range with respect to a total of 100 mol % of the divinyl aromatic compound, the monovinyl aromatic compound having no substituent at the α position, and the α,α-disubstituted olefin compound.

Divinyl aromatic compound; 0.2 to 75 mol %, preferably 0.3 to 65 mol %, more preferably 0.4 to 55 mol %, and optimally 5 to 50 mol %.

Monovinyl aromatic compound having no substituent at the α position; 7 to 99 mol %, preferably 10 to 95 mol %, and more preferably 15 to 90 mol %.

α,α-disubstituted olefin compound; 5 to 99 mol %, preferably 10 to 95 mol %, more preferably 15 to 90 mol %, and optimally 20 to 60 mol %.

For the Lewis acid catalyst (e) used here, any compound can be used without particular limitation as long as it is a compound composed of metal ions (acid) and a ligand (base) and can receive an electron pair. Among Lewis acid catalysts, in consideration of thermal decomposition resistance of the obtained copolymer, metal fluorides or complexes thereof are preferable, and di- to hexa-valent fluorides of metals such as B, Al, Ga, In, Si, Ge, Sn, Pb, Sb, Bi, Ti, W, Zn, Fe and V or complexes thereof are particularly preferable. These catalysts may be used alone or two or more thereof may be used in combination. In consideration of controlling the molecular weight and the molecular weight distribution of the obtained copolymer and the polymerization activity, an ether complex of boron trifluoride is most preferably used. Here, examples of ethers of the ether complex include diethyl ether and dimethyl ether.

For the Lewis acid catalyst, the amount of the Lewis acid catalyst used is preferably within a range of 0.001 to 100 mol, more preferably 0.01 to 50 mol, and most preferably 0.1 to 10 mol with respect to a total of 100 mol of all monomer components. When the amount thereof exceeds 100 mol, since the polymerization rate becomes too large, it becomes difficult to control the molecular weight distribution. In addition, when the amount thereof is less than 0.001 mol, the polymerization rate becomes too small, which leads to an increase in cost and is not suitable for industrial implementation.

In the method for manufacturing a copolymer of the present invention, one or more Lewis base compounds can be used as a cocatalyst if desired.

Specific examples of Lewis base compounds include the following compounds.

1) ester compounds such as ethyl acetate, butyl acetate, phenyl acetate, and methyl propionate,
2) thioester compounds such as methyl mercaptopropionic acid, and ethyl mercaptopropionic acid,
3) ketone compounds such as methyl ethyl ketone, methyl isobutyl ketone, and benzophenone,
4) amine compounds such as methylamine, ethylamine, propylamine, butylamine, cyclohexylamine, methylethylamine, dimethylamine, diethylamine, dipropylamine, and dibutylamine,
5) ether compounds such as diethyl ether and tetrahydropyran,
6) thioether compounds such as diethyl sulfide and diphenyl sulfide, and
7) phosphine compounds such as tripropylphosphine, tributylphosphine, trihexylphosphine, tricyclohexylphosphine, trioctylphosphine, vinylphosphine, propenylphosphine, cyclohexenylphosphine, dialkenylphosphine, and trialkenylphosphine.

Among these, ester compounds and ketone compounds are preferably used because they synergistically act with a Lewis acid catalyst and can easily control the polymerization rate and the molecular weight distribution of the polymer.

These Lewis base compounds may be used alone or two or more thereof may be used in combination.

The Lewis base compound, which is a cocatalyst component, is coordinated with a Lewis acid catalyst, which is a counter anion, during a polymerization reaction, controls the interaction between the active species carbocation and the counter anion, and adjusts a relative reaction frequency between a cycloolefin compound that functions as a chain transfer agent and a divinyl aromatic compound and a monovinyl aromatic compound. Generally, when the Lewis base compound is added, the interaction between the active species carbocation and the counter anion is strengthened, the divinyl aromatic compound and the monovinyl aromatic compound are prevented from causing an excessive insertion reaction, the chain transfer reaction after the insertion reaction of the cycloolefin compound easily occurs, and the molecular weight is easily controlled.

The amount of the Lewis base compound as a cocatalyst is preferably 0.005 to 500 mol, more preferably 0.01 to 100 mol, and still more preferably 0.1 to 50 mol with respect to a total of 100 mol of all monomers. Within the above range, a copolymer in which the polymerization rate is appropriately maintained, and at the same time, the selectivity of the reaction between monomers is improved, the productivity is excellent, an excessive increase or decrease in the molecular weight is prevented, and the mold processability is excellent is obtained.

In the polymerization reaction, the above monomers are cationically copolymerized in a homogeneous solvent containing polymerization raw materials that includes a mixture of the above monomers and a Lewis acid catalyst dissolved in a solvent with a dielectric constant of 2.0 to 15.0 at a temperature of 20° C. to 120° C.

The solvent is preferably an organic solvent which is a compound that does not essentially inhibit cationic polymerization, and dissolves a catalyst, a polymerization additive, a cocatalyst, monomers and a vinyl aromatic copolymer to be produced to prepare a homogenous solution, and which has a dielectric constant within a range of 2.0 to 15.0, and they may be used alone or two or more thereof may be used in combination. When the dielectric constant of the solvent is less than 2.0, this not preferable because the molecular weight distribution can be widened, and when the dielectric constant exceeds 15.0, the polymerization rate decreases.

In consideration of balance between the polymerization activity and the solubility, toluene, xylene, n-hexane, cyclohexane, methylcyclohexane or ethylcyclohexane is particularly preferably as the organic solvent. In addition, in consideration of the viscosity of the obtained polymerization solution and ease of heat removal, the amount of the solvent used is determined so that the concentration of the copolymer in the polymerization solution is 1 to 90 wt %, preferably 10 to 80 wt %, and particularly preferably 20 to 70 wt % when polymerization is completed. When the concentration is less than 1 wt %, the polymerization efficiency is low, which leads to an increase in cost, and when the concentration exceeds 90 wt %, the molecular weight and the molecular weight distribution increase, which leads to deterioration in the molding processability.

When the soluble polyfunctional vinyl aromatic polymer is produced, it is necessary to perform polymerization at a temperature of 20° C. to 120° C., and preferably 40° C. to 100° C. When the polymerization temperature exceeds 120° C., the selectivity of the reaction decreases, which causes problems such as an increase in the molecular weight distribution and formation of a gel, and when polymerization is performed at a polymerization temperature of lower than 20° C., since the catalytic activity is significantly weakened, it is necessary to add a large amount of the catalyst.

After the polymerization reaction is stopped, a method of collecting the copolymer is not particularly limited, and for example, generally used methods such as a heat concentration method, a steam stripping method, and precipitation in a poor solvent may be used.

The polyfunctional vinyl aromatic copolymer obtained in the above manufacturing method includes the structural unit (a) derived from a divinyl aromatic compound, the structural unit (b) derived from a monovinyl aromatic compound, and the structural unit (c) derived from a cycloolefin-based monomer having an aromatic condensed ring structure, in which at least some of the structural units (a) derived from a divinyl aromatic compound are present as a vinyl-group-containing structural unit (a1) represented by Formula (1). Thus, it is soluble in toluene, xylene, tetrahydrofuran, dichloroethane or chloroform.

Since the polyfunctional vinyl aromatic copolymers of the first, second, and third inventions have an unreacted vinyl group, they may be polymerized, cured, and molded alone, but they are preferably copolymerized with other polymerizable resins or monomers to prepare a second copolymer. Particularly, the polyfunctional vinyl aromatic copolymer of the present invention is excellent for copolymerizing with other monomers containing a conjugated diene to obtain a conjugated diene copolymer (rubber).

As raw materials, the above polyfunctional vinyl aromatic copolymer (A) of the present invention is copolymerized with 1) a conjugated diene compound (B), or 2) a conjugated diene compound (B) and an aromatic vinyl compound (C) to obtain a conjugated diene copolymer of the present invention. When the aromatic vinyl compound (C) is not used, it is possible to obtain a diene rubber such as butadiene rubber or isoprene rubber, and when the aromatic vinyl compound (C) is used, it is possible to obtain a conjugated diene copolymer such as SBR. The conjugated diene copolymer is also called a copolymer rubber because it exhibits characteristics of a rubber.

In a polymerization process for obtaining a conjugated diene copolymer, a method (method I) in which the polyfunctional vinyl aromatic copolymer (A) of the present invention is reacted with an organolithium compound, a polyfunctional anionic polymerization initiator is prepared in a predetermined reaction container in advance, and supplied to a reaction container in which a conjugated diene compound is polymerized, and a polymerization or copolymerization reaction is caused, a method (method II) in which raw materials including the polyfunctional vinyl aromatic copolymer (A) and the conjugated diene compound (B) or the polyfunctional vinyl aromatic copolymer (A), the conjugated diene compound (B) and the aromatic vinyl compound (C) and an organolithium compound (or an anionic polymerization initiator) are collectively supplied into a reaction container in which copolymerization is performed to cause a copolymerization reaction, and a method (method III) in which the conjugated diene compound (B) or the conjugated diene compound (B) and the aromatic vinyl compound (C) are supplied into a predetermined reaction container to polymerize the conjugated diene compound or copolymerize the conjugated diene compound and the aromatic vinyl compound, the conjugated diene compound polymer having an active terminal produced in the reaction container or a copolymer of a conjugated diene compound and an aromatic vinyl compound is reacted with the polyfunctional vinyl aromatic copolymer (A) to synthesize a conjugated diene copolymer or the like can be used.

Among these polymerization methods, in consideration of the efficiency of the copolymerization reaction with the polyfunctional vinyl aromatic copolymer (A) of the present invention, the method I is preferable.

Examples of the conjugated diene compound (B) include 1,3-butadiene, isoprene, 2,3-dimethyl-1,3-butadiene, 1,3-pentadiene, 3-methyl-1,3-pentadiene, 1,3-heptadiene, and 1,3-hexadiene. Among these, 1,3-butadiene and isoprene are preferable. These may be used alone or two or more thereof may be used in combination.

Regarding the aromatic vinyl compound (C), styrene, α-methylstyrene, 1-vinyl naphthalene, 3-vinyl toluene, ethyl vinyl benzene, vinyl xylene, 4-cyclohexylstyrene, 2,4,6-trimethylstyrene, tert-butoxy dimethylsilyl styrene and isopropoxydimethylsilyl styrene may be used alone or two or more thereof may be used in combination. Among these, styrene is particularly preferable.

When 1,3-butadiene is used as the conjugated diene compound (B) and styrene is used as the aromatic vinyl compound, so-called styrene-butadiene rubber (SBR) is obtained. In addition, when styrene is not used as the aromatic vinyl compound, and 1,3-butadiene is used as the conjugated diene compound (B), so-called butadiene rubber (BR) is obtained. When isoprene is used as the conjugated diene compound (B) and there is no structural unit of the aromatic vinyl compound (C), isoprene rubber (IR) is obtained. Among these, when the styrene-butadiene rubber (SBR) structure is provided, this is particularly preferable because it has excellent wear resistance, heat resistance, and aging resistance.

The organolithium compound used as the initiator is not particularly limited, and examples thereof include monorganolithium compounds such as n-butyllithium, sec-butyl lithium, tert-butyl lithium, n-propyl lithium, iso-propyl lithium, and benzyl lithium; and polyfunctionalorganolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethyl cyclohexane, 1,3,5-trilithiobenzene, and 1,3,5-trilithio-2,4,6-triethylbenzene. Among these, monorganolithium compounds such as n-butyllithium and sec-butyl lithium, tert-butyl lithium are preferable.

When a conjugated diene copolymer is produced, it is preferable to add the following polar compounds as a vinylizing agent for controlling the microstructure of the conjugated diene part and in order to improve the polymerization rate.

Examples of polar compounds include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-tert-amylate, potassium-tert-butylate, sodium-tert-butylate, and sodium amylate; and phosphine compounds such as triphenylphosphine. These polar compounds may be used alone or two or more thereof may be used in combination.

The amount of the polar compound used is selected according to the purpose and the degree of effect of the obtained conjugated diene copolymer composition, but is preferably 0.005 to 100 mol with respect to 1 mol of the organolithium compound as an initiator.

The conjugated diene copolymer is preferably polymerized in the predetermined solvent. Particularly preferably, it is polymerized in a solvent having the above dielectric constant. The solvent is not particularly limited, for example, hydrocarbon solvents such as saturated hydrocarbon and aromatic hydrocarbon may be used. Specific examples thereof include aliphatic hydrocarbons such as butane, pentane, hexane, and heptane; alicyclic hydrocarbons such as cyclopentane, cyclohexane, methyl cyclopentane, and methyl cyclohexane; and aromatic hydrocarbons such as benzene, toluene, and xylene and hydrocarbon solvents composed of a mixture thereof.

Preferably, the above conjugated diene compound and polymerization solvent are used alone or a mixed solution thereof is treated using an organometallic compound. Thereby, allenes and acetylenes contained in the conjugated diene compound and the polymerization solvent can be treated. As a result, a polymer having an active terminal with a high concentration can be obtained, and a high modification rate can be achieved.

In addition, a modifying agent can be additionally reacted with the polymerization active terminal of the conjugated diene copolymer of the present invention. In this specification, the conjugated diene copolymer obtained by this reaction is also referred to as a modified conjugated diene copolymer.

As the modifying agent (also referred to as a "terminal modifying agent") used in the present embodiment, a compound having a functional group that can react with the polymerization active terminal of the conjugated diene copolymer is used. The terminal modifying agent is not particularly limited, but when a monofunctional compound is used, a linear both-end-modified diene copolymer is obtained, and when a polyfunctional compound is used, a branched both-end-modified diene copolymer is obtained. Preferably, a monofunctional or polyfunctional compound containing at least one element selected from the group consisting of nitrogen, silicon, tin, phosphorous, oxygen, sulfur, and halogen is used as the terminal modifying agent. In addition, when a terminal modifying agent containing an onium generating agent is added and reacted, an onium structure can be introduced into the modified conjugated diene copolymer. In addition, a terminal modifying agent containing a plurality of functional group containing these elements in the molecule or a terminal modifying agent containing a functional group containing a plurality of these elements can also be used. For example, when a molded product such as a vehicle tire is formed in a process of continuously adding these terminal modifying agents, a vulcanized rubber composition having lower rolling resistance, excellent wear resistance, and excellent tensile strength and tear strength tends to be obtained.

Hereinafter, various terminal modifying agents that can be used in the present invention will be described. However, the present invention is not limited to the examples.

Examples of nitrogen-containing compounds as the terminal modifying agent include isocyanate compounds, isothiocianate compounds, isocyanuric acid derivatives, nitrogen-group-containing carbonyl compounds, nitrogen-group-containing vinyl compounds, and nitrogen-group-containing epoxy compounds.

Examples of silicon-containing compounds as the terminal modifying agent include silicon halide compounds, epoxidized silicon compounds, vinylized silicon compounds, alkoxy silicon compounds, and alkoxy silicon compounds containing a nitrogen-containing group.

Examples of tin-containing compounds as the terminal modifying agent include tin halide compounds and organic tin carboxylate compounds. Examples of phosphorous-containing compounds as the terminal modifying agent include phosphite ester compounds and phosphino compounds. Examples of oxygen-containing compounds as the terminal modifying agent include epoxy compounds, ether compounds, and ester compounds. Examples of sulfur-containing compounds as the terminal modifying agent include mercapto group derivatives, thiocarbonyl compounds, and isothiocianate. Examples of halogen-containing compounds as the terminal modifying agent include the above silicon halide compounds and tin halide compounds.

Examples of onium generating agents as a terminal modifying agent include protected amine compounds (that produces ammonium) that can form a primary or secondary amine, protected phosphine compounds (that produces phosphonium) that can form hydrophosphine, and compounds that can form a hydroxy group and a thiol (that produces oxonium or sulfonium), a terminal modifying agent having a functional group for binding the onium generating agent and the above modified conjugated diene polymer in the molecule is preferably used. Examples of functional groups for binding the modified conjugated diene polymer include unsaturated groups such as a carbonyl group (ketone, ester, etc.) and a vinyl group, and an epoxy group, a silicon halide group, and an alkoxy silicon group.

Specific examples of terminal modifying agents include, as an isocyanate compound, 2,4-tolylene diisocyanate, 2,6-tolylene diisocyanate, diphenylmethane diisocyanate, polymeric type diphenylmethane diisocyanate (CMDI), phenyl isocyanate, isophorone diisocyanate, hexamethylene diisocyanate, butyl isocyanate, and 1,3,5-benzene triisocyanate. In addition, examples of isocyanuric acid derivatives include 1,3,5-tris(3-trimethoxysilylpropyl)isocyanurate, 1,3,5-tris(3-triethoxysilylpropyl)isocyanurate, 1,3,5-tri(oxylan-2-yl)-1,3,5-triazine-2,4,6-trione, 1,3,5-tris(isocyanatomethyl)-1,3,5-triazine-2,4,6-trione, and 1,3,5-trivinyl-1,3,5-triazine-2,4,6-trione.

Specific examples of nitrogen-group-containing carbonyl compounds include 1,3-dimethyl-2-imidazolidinone, 1-methyl-3-ethyl-2-imidazolidinone, 1-methyl-3-(2-methoxyethyl)-2-imidazolidinone, N-methyl-2-pyrrolidone, N-methyl-2-piperidone, N-methyl-2-quinolone, 4,4'-bis(diethylamino)benzophenone, 4,4'-bis(dimethylamino)benzophenone, methyl-2-pyridyl ketone, methyl-4-pyridyl ketone, propyl-2-pyridyl ketone, di-4-pyridyl ketone, 2-benzoylpyridine, N,N,N',N'-tetramethylurea, N,N-dimethyl-N',N'-diphenylurea, methyl N,N-diethyl carbamate, N,N-diethylacetamide, N,N-dimethyl-N',N'-dimethylaminoacetamide, N,N-dimethylpicolinic acid amide, and N,N-dimethylisonicotinamide.

Specific examples of nitrogen-group-containing vinyl compounds include N,N-dimethylacrylamide, N,N-dimethylmethacrylamide, N-methylmaleimide, N-methylphthalimide, N,N-bistrimethylsilylacrylamide, morphorinoacrylamide, 3-(2-dimethylaminoethyl)styrene, (dimethylamino)dimethyl-4-vinylphenylsilane, 4,4'-vinylidenebis(N,N-dimethylaniline), 4,4'-vinylidenebis(N,N-diethylaniline), 1,1-bis(4-morpholinophenyl)ethylene, and 1-phenyl-1-(4-N,N-dimethylaminophenyflethylene.

Specific examples of nitrogen-group-containing epoxy compounds include N,N,N',N'-tetraglycidyl-1,3-bisaminomethylcyclohexane, N,N,N',N'-tetraglycidyl-m-xylene diamine, 4,4-methylene-bis(N,N-diglycidyl aniline), 1,4-bis(N,N-diglycidyl amino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, 2-[2-(N,N-diglycidylamino)ethyl]-1-glycidylpyrrolidine, bis(glycidyl methyl aniline), N,N'-diglycidyl-4-glycidyloxy aniline, 4,4'-diglycidyl-diphenylmethylamine, 4,4'-diglycidyl-dibenzylmethylamine, N,N-diglycidyl aniline, N,N-diglycidyl ortho-toluidine, and N,N-diglycidyl amino methyl cyclohexane.

Specific examples of silicon halide compounds include dibutyldichlorosilane, methyltrichlorosilane, dimethyldichlorosilane, methyldichlorosilane, trimethylchlorosilane, tetrachlorosilane, tris(trimethylsiloxy)chlorosilane, tris(dimethylamino)chlorosilane, hexachlorodisilane, bis(trichlorosilyl)methane, 1,2-bis(trichlorosilyl)ethane, 1,2-bis(methyldichlorosilyl)ethane, 1,4-bis(trichlorosilyl)butane, and 1,4-bis(methyldichlorosilyl)butane.

Specific examples of epoxidized silicon compounds include 3-glycidoxypropyltrimethoxysilane, 3-glycidoxypropyltriethoxysilane, 3-glycidoxypropylmethyldiethoxysilane, and epoxy-modified silicone.

Specific examples of alkoxy silicon compounds include tetramethoxysilane, tetraethoxysilane, triphenoxymethylsilane, and methoxy-substituted polyorganosiloxane.

Specific examples of alkoxy silicon compounds containing a nitrogen-containing group include 3-dimethylaminopropyltrimethoxysilane, 3-dimethylaminopropylmethyldimethoxysilane, 3-diethylaminopropyltriethoxysilane, 3-morpholinopropyltrimethoxysilane, 3-piperidinopropyltriethoxysilane, 3-hexamethyleneiminopropylmethyldiethoxysilane, 3-(4-methyl-1-piperazinyl)propyltriethoxysilane, 1-[3-(triethoxysilyl)-propyl]-3-methylhexahydropyrimidine, 3-(4-trimethylsilyl-1-piperazinyl)propyltriethoxysilane, 3-(3-triethylsilyl-1-imidazolidinyl)propylmethyldiethoxysilane, 3-(3-trimethylsilyl-1-hexahydropyrimidinyl) propyltrimethoxysilane, 3-dimethylamino-2-(dimethylaminomethyl)propyltrimethoxysilane, bis(3-dimethoxymethylsilylpropyl)-N-methylamine, bis(3-trimethoxysilylpropyl)-N-methylamine, bis(3-triethoxysilylpropyl)methylamine, tris(trimethoxysilyl) amine, tris(3-trimethoxysilylpropyl)amine, N,N,N',N'-tetra (3-trimethoxysilylpropyl)ethylenediamine, 3-isocyanatopropyltrimethoxysilane, 3-cyanopropyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, 2,2-dimethoxy-1-methyl-1-aza-2-silacyclopentane, 2,2-dimethoxy-8-(4-methylpiperazinyl) methyl-1,6-dioxa-2-silacyclooctane, and 2,2-dimethoxy-8-(N,N-diethylamino)methyl-1,6-dioxa-2-silacyclooctane.

As the protected amine compound that can form a primary or secondary amine, specific examples of compounds having an unsaturated bond and a protected amine in the molecule include 4,4'-vinylidene bis[N,N-bis(trimethylsilyl)aniline], 4,4'-vinylidene bis[N,N-bis(triethylsilyl)aniline], 4,4'-vinylidene bis[N,N-bis(t-butyldimethylsilyl) aniline], 4,4'-vinylidene bis[N-methyl-N-(trimethylsilyl)aniline], 4,4'-vinylidene bis[N-ethyl-N-(trimethylsilyl)aniline], 4,4'-vinylidene bis[N-methyl-N-(triethylsilyl)aniline], 4,4'-vinylidene bis[N-ethyl-N-(triethylsilyl)aniline], 4,4'-vinylidene bis[N-methyl-N-(t-butyldimethylsilyl) aniline], 4,4'-vinylidene bis[N-ethyl-N-(t-butyldimethylsilyl)aniline], 1-[4-N,N-bis(trimethylsilyl)aminophenyl]-1-[4-N-methyl-N-(trimethylsilyl)aminophenyl]ethylene, and 1-[4-N,N-bis(trimethylsilyl)aminophenyl]-1-[4-N,N-dimethylaminophenyl]ethylene.

As the protected amine compound that can form a primary or secondary amine, specific examples of compounds having an alkoxysilane and a protected amine in the molecule include N,N-bis(trimethylsilyl)aminopropyltrimethoxysilane, N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethylmethyldiethoxysilane, N,N-bis (triethylsilyl)aminopropylmethyldiethoxysilane, 3-(4-trimethylsilyl-1-piperazinyl)propyltriethoxysilane, 3-(3-triethylsilyl-1-imidazolidinyl)propylmethyldiethoxysilane, 3-(3-trimethylsilyl-1-hexahydropyrimidinyl)propyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, and 2,2-dimethoxy-1-methyl-1-aza-2-silacyclopentane.

Specific examples of tin halide compounds include tetrachlorotin, tetrabromstin, trichlorobutyltin, trichlorooctyltin, dichloromethane, dichlorodibutyltin, chlorotributyltin, chlorotrioctyltin, chlorotriphenyltin, 1,2-bis(trichlorostanyl)ethane, 1,2-bis(methyldichlorostanyl)ethane, 1,4-bis(trichlorostanyl)butane, and 1,4-bis(methyldichlorostanyl)butane.

Specific examples of organic tin carboxylate compounds include ethyl tin tristearate, butyl tin trioctanoate, butyl tin tristearate, butyl tin trilaurate, and dibutyl tin bisoctanoate.

Specific examples of phosphite ester compounds include trimethyl phosphate, tributyl phosphate, and triphenoxide phosphite.

Specific examples of phosphino compounds include protected phosphino compounds such as P,P-bis(trimethylsilyl) phosphinopropyltrimethoxysilan and P,P-bis(triethylsilyl) phosphinopropylmethylethoxysilane, and 3-diphenylphosphinopropyltrimethoxysisilane and 3-diphenylphosphinopropyltrimethoxysisilane.

Specific examples of oxygen-containing compounds include polyglycidyl ethers such as ethylene glycol diglycidyl ether and glycerin triglycidyl ether, polyepoxy compounds such as 1,4-diglycidyl benzene, 1,3,5-triglycidyl benzene, polyepoxidized liquid polybutadiene, epoxidized soybean oil, and epoxidized linseed oil, and ester compounds such as dimethyl adipate, diethyl adipate, dimethyl terephthalate, and diethyl terephthalate, which generate hydroxy groups at the terminal of the polymer.

Specific examples of sulfur-containing compounds include protected thiol compounds such as S-trimethylsilylthiopropyltrimethoxysisilane and S-triethylsilylthiopropylmethyldiethylsilane, and S-methylthiopropyltrimethoxysisilane, S-ethylthiopropylmethyldiethoxysisilane, ethyl N,N-diethyldithiocarbamate, phenyl isothiocianate, phenyl-1,4-diisothiocianate, hexamethylenediisothiocianate, and butylisothiocianate.

The amount of the terminal modifying agent used is preferably more than 0.5 equivalent and 10 equivalent or less, more preferably more than 0.7 equivalent and 5 equivalent or less, and still more preferably more than 1 equivalent and 4 equivalent or less with respect to 1 equivalent of a living terminal of the conjugated diene copolymer. Here, in the present embodiment, the amount of the living terminal of the conjugated diene polymer may be calculated from the amount of an organolithium compound used for polymerization and the number of lithium atoms bonded to the organolithium compound or may be calculated from the number average molecular weight of the obtained conjugated diene copolymer.

The terminal modifying agents may be used alone or two or more thereof may be used in combination.

The weight average molecular weight (in terms of polystyrene) of the conjugated diene copolymer of the present invention is preferably 100,000 to 2,000,000 and more preferably 150,000 to 1,000,000 in consideration of processability and physical properties. The weight average molecular weight can be determined by measuring a chromatogram using GPC using a column using a polystyrene gel as a filling agent and using a calibration curve using standard polystyrene.

In the composition of the structural units of the conjugated diene copolymer of the present invention, when the aromatic vinyl compound (C) is not used, the ratio of the polyfunctional vinyl aromatic copolymer (A) and the conjugated diene compound (B) is preferably in the following range.

The proportion of the structural unit (A1) derived from the polyfunctional vinyl aromatic copolymer (A) is 0.001 to 6 weight %, preferably 0.001 to 5 weight %, more preferably 0.005 to 5 weight %, and still more preferably 0.01 to 5 weight %, and the proportion of the structural unit (B1)

derived from the conjugated diene compound (B) is 29 to 99.999 weight %, preferably 80 to 99.999 weight %, more preferably 90 to 99.995 weight %, and still more preferably 95 to 99.99 weight %.

When the aromatic vinyl compound (C) is used, the proportion is preferably in the following range. The proportion of the structural unit (A1) has the same range as described above, and the proportion of the structural unit (B1) is 30 to 97.999 weight %, preferably 45 to 94.995 weight %, and more preferably 55 to 89.99 weight %. The proportion of the structural unit (C1) derived from the aromatic vinyl compound (C) is 2 to 50 weight %, preferably 5 to 45 weight %, and more preferably 10 to 40 weight %.

In the case of a modified conjugated diene copolymer, the proportion of a structural unit (H1) derived from a terminal modifying agent is preferably 1 to 0 weight %. When the structural unit (H1) is included, in calculation of the above proportion, the structural unit (H1) is an external number, and is not included in the calculation.

The structural unit (A1) provides a branched structure to the conjugated diene copolymer, increases the molecular weight and/or increases the amount of the terminal modifying agent introduced, improves physical properties of the conjugated diene copolymer and/or improves the dispersibility of the reinforcing filling agent.

The microstructure (cis, trans, vinyl bond amount) of the conjugated diene copolymer can be arbitrarily changed using a polar compound or the like, but the content of the vinyl bond (1,2-bond) in the conjugated diene unit is preferably 10 to 80 mol % before the terminal is modified. When the conjugated diene copolymer of the present invention is used as a conjugated diene copolymer composition to be described below and additionally crosslinked and used as an automobile tire, the amount thereof is preferably 20 to 75 mol %, more preferably 30 to 75 mol %, and still more preferably 40 to 70 mol % in order to achieve high balance between the rolling resistance performance and the wear resistance. In this case, the mass ratio of the cis bond to the trans bond in the conjugated diene bond unit is preferably cis bond/trans bond=1/1.1 to 1.5.

As necessary, a reaction terminating agent may be added to the polymer solution of the conjugated diene copolymer obtained by the above polymerization method. Regarding the reaction terminating agent, for example, alcohols such as methanol, ethanol, and propanol; organic acids such as stearic acid, lauric acid, and octanoic acid; water, and the like can be used.

After the polymerization reaction of the conjugated diene copolymer is performed, metals contained in the polymer may be decalcified as necessary. As a decalcification method, for example, a method in which an oxidizing agent such as water, organic acid, inorganic acid, and hydrogen peroxide is brought into contact with a polymer solution to extract metals, and an aqueous layer is then separated is used.

In addition, an antioxidant may be added to the polymer solution of the conjugated diene copolymer. Examples of antioxidants include a phenolic stabilizer, a phosphorus stabilizer, and a sulfur stabilizer.

Regarding a method of acquiring a conjugated diene copolymer from a polymer solution, conventionally known methods can be applied. For example, a method in which a solvent is separated by steam stripping or the like and the polymer is then filtered, and additionally dehydrated and dried to obtain a polymer, a method in which concentration is performed in a flushing tank, and additionally devolatilization is performed with a vent extrusion machine or the like, a method in which devolatilization is directly performed with a drum dryer or the like can be applied.

The conjugated diene copolymer composition of the present invention preferably contains 0.5 to 200 parts by mass of at least one reinforcing filling agent selected from the group consisting of silica inorganic filling agents, metal oxides, metal hydroxides and carbon black with respect to 100 parts by mass of the conjugated diene copolymer.

Regarding the silica inorganic filling agent contained in the conjugated diene copolymer composition, solid particles containing $SiO_2$ or a silicate as a main component of the structural unit are preferably used. Here, the main component is a component that occupies 50 mass % or more of the whole, preferably a component that occupies 70 mass % or more, and more preferably a component that occupies 90 mass % or more.

Specific examples of silica inorganic filling agents include inorganic fibrous materials such as silica, clay, talc, mica, diatomaceous earth, wollastonite, montmorillonite, zeolite, and glass fibers. The silica inorganic filling agents may be used alone or two or more thereof may be used in combination. In addition, a silica inorganic filling agent having a hydrophobic surface or a mixture of a silica inorganic filling agent and a non-silica inorganic filling agent can also be used. Among these, silica and glass fibers are preferable, and silica is more preferable.

Regarding the silica, dry silica, wet silica, synthetic silicate silica and the like can be used, and among these, wet silica is preferable because it is more excellent in improvement in fracture characteristics and wet skid resistance performance.

A nitrogen adsorption specific surface area required for a BET adsorption method for the silica inorganic filling agent in order to obtain favorable wear resistance and fracture characteristics is preferably 170 to 300 $m^2/g$ and more preferably 200 to 300 $m^2/g$.

The amount of the silica inorganic filling agent added in the conjugated diene copolymer composition is preferably 0.5 to 200 parts by mass with respect to 100 parts by mass of the conjugated diene copolymer. The upper limit of the silica inorganic filling agent added with respect to 100 parts by mass of the conjugated diene copolymer which is a rubber component is preferably 100 parts by mass or less and more preferably 75 parts by mass or less. The lower limit is preferably 5 parts by mass or more, more preferably 20 parts by mass or more, and particularly preferably 35 parts by mass or more. When the amount of the silica inorganic filling agent added is within the above range, an effect of adding the filling agent is exhibited, the dispersibility of the silica inorganic filling agent is favorable, processability of the obtained composition is improved, and the mechanical strength is improved.

Carbon black may be added as a reinforcing filling agent other than the silica inorganic filling agent to the conjugated diene copolymer composition.

Regarding carbon black, for example, carbon black of each class such as SRF, FEF, HAF, ISAF, and SAF can be used. In order obtain an excellent reinforcing effect, carbon black having a nitrogen adsorption specific surface area of 50 $m^2/g$ or more and a dibutyl phthalate (DBP) oil absorption of 80 mL/100 g is preferable.

The amount of carbon black added with respect to 100 parts by mass of the conjugated diene copolymer is 0.5 to 200 parts by mass, preferably 3 to 100 parts by mass, and more preferably 5 to 50 parts by mass.

In addition to the silica inorganic filling agent and carbon black, a metal oxide or a metal hydroxide as a reinforcing filling agent may be added to the conjugated diene copolymer composition. The metal oxide is preferably a solid particle whose main component is represented by the chemical formula MxOy (M represents a metal atom, and x and y each represent an integer of 1 to 6). Here, the main component is a component that occupies 50 mass % or more of the whole, preferably a component that occupies 70 mass % or more, and more preferably a component that occupies 90 mass % or more.

Regarding the metal oxide, for example, alumina, titanium oxide, magnesium oxide, zinc oxide, and the like can be used. Examples of metal hydroxides include aluminum hydroxide, magnesium hydroxide, and zirconium hydride. Metal oxides and metal hydroxides may be used alone or two or more thereof may be used in combination. In addition, a mixture with an inorganic filling agent other than the metal oxide and metal hydroxide can be used.

The conjugated diene copolymer composition may contain a silane coupling agent. The silane coupling agent has a function of allowing a conjugated diene copolymer and a silica inorganic filling agent to interact closely and has an affinity group or a binding group therefor.

Specific examples of silane coupling agents include bis-[3-(triethoxysilyl)-propyl]-tetrasulfide, bis-[3-(triethoxysilyl)-propyl]-disulfide, and bis-[2-(triethoxysilyl)-ethyl]-tetrasulfide.

The amount of the silane coupling agent added with respect to 100 parts by mass of the silica inorganic filling agent is preferably 0.1 to 30 parts by mass, more preferably 0.5 to 20 parts by mass, and still more preferably 1 to 15 parts by mass. When the amount of the silane coupling agent added is within the above numerical range, a sufficient addition effect can be obtained, and economic efficiency can be improved.

The conjugated diene copolymer composition can be produced by mixing the above components.

A method of mixing a conjugated diene copolymer, at least one reinforcing filling agent selected from the group consisting of silica inorganic filling agents, metal oxides, metal hydroxides and carbon black and a silane coupling agent if desired is not particularly limited. For example, a melt kneading method using a general mixing machine such as an open roll, a Bunbury mixer, a kneader, a single-screw extruder, a twin-screw extruder, or a multi-screw extruder and a method of dissolving and mixing components and then heating and removing a solvent may be exemplified. Among these, a melt kneading method using a roller, a Bunbury mixer, a kneader, or an extruder is preferable in consideration of productivity and good kneadability. In addition, either a method of kneading a rubber component and various compounding agents at once or a method of mixing them a plurality of times in a divided manner can be applied.

In the present invention, the degree of polymer concentration on the surface of the filling material can be expressed by the amount of bound rubber of the modified conjugated diene polymer at 25° C. The amount of bound rubber in the conjugated diene copolymer composition (rubber composition) after the above kneading is completed is preferably 15 mass % or more, more preferably 20 mass % or more, and still more preferably 30 mass % or more in consideration of improvement in wear resistance and breaking strength.

Here, the amount of bound rubber can be measured by the method described in examples to be described below.

The conjugated diene copolymer composition may be a vulcanized composition that has been vulcanized with a vulcanizing agent. Regarding the vulcanizing agent, for example, a radical generating agent such as an organic peroxide and an azo compound, an oxime compound, a nitroso compound, a polyamine compound, sulfur, and a sulfur compound can be used. Examples of sulfur compounds include sulfur monochloride, sulfur dichloride, disulfide compounds, and polymeric polysulfide compounds.

The amount of the vulcanizing agent used is not particularly limited, and is preferably 0.01 to 20 parts by mass and more preferably 0.1 to 15 parts by mass with respect to 100 parts by mass of the conjugated diene copolymer. Regarding the vulcanization method, a conventionally known method can be applied, and the vulcanization temperature is, for example, preferably 120° C. to 200° C., and more preferably 140° C. to 180° C.

During vulcanization, as necessary, a vulcanization accelerator may be used. A conventionally known material can be used as the vulcanization accelerator, and for example, vulcanization accelerators such as a sulfonamide type, a guanidine type, a thiuram type, an aldehyde-amine type, an aldehyde-ammonia type, a thiazole type, a thiourea type, and a dithiocarbamate type may be exemplified. Zinc oxide, stearic acid, or the like can be used as a vulcanization aid.

The amount of the vulcanization accelerator used is not particularly limited, and is preferably 0.01 to 20 parts by mass and more preferably 0.1 to 15 parts by mass with respect to 100 parts by mass of the conjugated diene copolymer.

In order to improve processability, a rubber softening agent may be added to the conjugated diene copolymer composition of the present invention. Regarding the rubber softening agent, a mineral oil, a liquid or low-molecular-weight synthetic softening agent is preferable.

Mineral oil-based rubber softening agents called process oils or extender oils used to soften a rubber, increase the volume, and improve processability are mixtures of aromatic rings, naphthenic rings, and paraffin chains, and an agent in which the number of carbon atoms of paraffin chains is 50% or more of all carbon atoms is called a paraffin type, and an agent in which the number of carbon atoms of naphthenic rings is 30% to 45% of all carbon atoms is called a naphthenic type, and an agent in which the number of aromatic carbon atoms is more than 30% is called an aromatic type. The rubber softening agent used in the present embodiment is preferably a naphthenic and/or paraffin type.

The amount of the rubber softening agent added is not particularly limited, and is preferably 10 to 80 parts by mass and more preferably 20 to 50 parts by mass with respect to 100 parts by mass of the conjugated diene copolymer.

As long as the purpose of the present embodiment is not impaired, in the conjugated diene copolymer composition, softening agents and filling agents other than those described above, and additionally various additives such as a heat-resistant stabilizer, an antistatic agent, a weather-resistant stabilizer, an antioxidant, a coloring agent, and a lubricant may be used. Specific examples of filling agents include calcium carbonate, magnesium carbonate, aluminum sulfate, and barium sulfate.

Examples of softening agents added as necessary in order to adjust the hardness and fluidity of a desired product include liquid paraffin, castor oil, and linseed oil. Known materials can be applied as a heat-resistant stabilizer, an antistatic agent, a weather-resistant stabilizer, an antioxidant, a coloring agent, and a lubricant.

The rubber crosslinked material of the present invention is obtained by crosslinking the above rubber composition. For example, for a tire, the above rubber composition is extruded according to the shape of the tire (specifically, the shape of the tread), molded, and heated and pressurized in a vulcanizing machine to produce a tread, and this tread and other parts can be assembled to produce a desired tire.

The conjugated diene copolymer composition (rubber composition) of the present invention has excellent mechanical strength and wear resistance when it is made into the rubber crosslinked material. Therefore, as described above, the composition can be preferably applied to treads of tires such as fuel-efficient tires, large tires, and high-performance tires, and tire members such as sidewall members. In addition, the composition can also be preferably used for rubber belts, rubber hoses, footwear materials, and the like in addition to the tire members.

EXAMPLES

The present invention will be described below in more detail with reference to examples, but the present invention is not limited to these examples. Here, unless otherwise specified, the parts referred to in examples are parts by weight, and physical properties were evaluated by the following methods.

1) Molecular Weight and Molecular Weight Distribution

The molecular weight and the molecular weight distribution were measured using GPC (HLC-8220GPC commercially available from Tosoh Corporation), and using tetrahydrofuran (THF) as a solvent, a flow rate of 1.0 ml/min, a column temperature of 38° C., and a calibration curve with monodisperse polystyrene.

2) Structure of Polyfunctional Vinyl Aromatic Copolymer

The structure was determined using a JNM-LA600 nuclear magnetic resonance spectrometer (commercially available from JEOL Ltd.) through $^{13}$C-NMR and $^{1}$H-NMR analysis. Chloroform-di was used as the solvent, and a resonance line of tetramethylsilane was used as an internal standard.

3) Mooney Viscosity (ML(1+4100°) C.)

According to JIS K 6300-1, the Mooney viscosity was determined using an L-shaped rotor with preheating for 1 minute, a rotor operation time of 4 minutes, and a temperature of 100° C.

4) Confirmation of Microgel Product (Haze)

A sample prepared by dissolving 0.5 g of a copolymer rubber in 100 g of toluene was put into a quartz cell, and the Haze (turbidity) thereof was measured using an integrating sphere type light transmittance measuring device (SZ-Σ90 commercially available from Nippon Denshoku Industries Co., Ltd.) using toluene as a reference sample.

When the Haze value was less than 0.5, there was no microgel: ○, and when the Haze value exceeded 0.5, there was a microgel: X.

5) Glass Transition Temperature (Tg)

A solution prepared by dissolving a polyfunctional vinyl aromatic copolymer in toluene was uniformly applied to a glass substrate and heated and dried using a hot plate at 90 minutes for 30 minutes so that the thickness after drying was 20 μm. A resin film obtained together with the glass substrate was set in a thermomechanical analyzer (TMA), heated to 220° C. at a heating rate of 10° C./min under a nitrogen gas flow, and additionally heated at 220° C. for 20 minutes, and thus the remaining solvent was removed and the polyfunctional vinyl aromatic copolymer was cured. The glass substrate was cooled to room temperature, an analysis probe was then brought into contact with a sample in the TMA measuring device, scan measurement was performed at 30° C. to 360° C. at a heating rate of 10° C./min under a nitrogen gas flow, and a softening temperature was determined by a tangent method.

6) Content of Vinyl Bond of Conjugated Diene Unit

A carbon disulfide solution was used as a sample, an infrared spectrum within a range of 600 to 1,000 cm-1 was measured using a solution cell, a vinyl bond amount was determined according to the calculation formula of the Hampton (styrene-butadiene copolymer) method based on the absorbance at a predetermined wave number. A Spectrum 100 (commercially available from PerkinElmer Co., Ltd.) was used as the device.

7) Amount of Bound Rubber (%)

100 parts by mass of a modified conjugated diene polymer and 60 parts by mass of wet silica (BET method specific surface area: 205±10 $m^2$/g, product name "Nipsil AQ" commercially available from Tosoh Silica Corporation) were kneaded using a closed kneading device with a kneading chamber internal volume of 2 L with {(volume of kneaded rubber composition/kneading chamber internal volume)×100} of 60%, and when the maximum kneading temperature reached 160° C., the rubber kneaded product was discharged to obtain a rubber composition M for measuring the amount of bound rubber.

0.2 g of the rubber composition M was cut into 1 mm squares, the mass was measured, and the composition was then added to 25 mL of toluene, the mixture was left at 25° C. for 48 hours, and then filtered with a glass fiber filter (commercially available from ADVANTEC) to separate the toluene-insoluble content, and the separated toluene-insoluble content was then vacuum-dried at 25° C. and then weighed, and thus the amount of bound rubber was determined according to the following formula.

Amount of bound rubber (%)={(mass of toluene-insoluble content−mass of wet silica in rubber composition *M*)/(mass of rubber composition *M*−mass of wet silica in rubber composition *M*)}×100

Here, the BET method specific surface area of silica was measured according to ISO 5794/1.

8) Tensile Strength

A 300% modulus was measured by a tensile test method according to JIS K 6251.

In the first invention, the measured value of the crosslinked rubber obtained in Comparative Example 1 was set as 100, and indexing was performed.

In the second invention, the measured value of the crosslinked rubber obtained in Example 20B was set as 100, and indexing was performed.

In the third invention, the measured value of the crosslinked rubber obtained in Example 10C was set as 100, and indexing was performed.

A higher index value indicates better tensile strength.

9) Wear Resistance

Using a method using a Lambourn type wear testing machine according to JIS K 6264, the amount of wear with a slip rate of 30% was measured.

In the first invention, the measured value of the crosslinked rubber obtained in Comparative Example 1 was set as 100, and indexing was performed.

In the second invention, the measured value of the crosslinked rubber obtained in Example 20 was set as 100, and indexing was performed.

In the third invention, the measured value of the cross-linked rubber obtained in Example 10 was set as 100, and indexing was performed.

A higher index value indicates better wear resistance.

10) Solvent Solubility

When the copolymer was soluble in toluene, xylene, THF, dichloroethane, dichloromethane, and chloroform, 100 g or more of the copolymer was dissolved in 100 g of each of the solvents, and gel formation was not observed, this was determined as solvent-soluble o.

Raw materials used in examples and abbreviations thereof are as follows.

DVB-630; mixture containing divinylbenzene component and ethyl vinyl benzene component; divinylbenzene component content 63.0 wt %, commercially available from NIPPON STEEL Chemical & Material Co., Ltd.)

Indene; commercially available from Wako Pure Chemical

Industries, Ltd.

BHT; 2,6-di-tert-butyl-p-cresol

BTESPA; bis(3-trimethoxysilylpropyl)methylamine

Examples of First Invention

Example 1A 92.98 g of DVB-630 (0.45 mol of a divinylbenzene component and 0.26 mol of an ethyl vinyl benzene component), 276.58 g (2.29 mol) of indene, and 1.50 mol (172.5 mL) of N-propyl acetate were put into a 1.0 L reaction container, 60 mmol of a boron trifluoride diethyl ether complex (7.5 mL) was added at 70° C., and the mixture was reacted for 2.5 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed, and it was confirmed that 221.7 g of the copolymer 1A was obtained.

In examples and comparative examples, the obtained copolymer was a soluble polyfunctional vinyl aromatic copolymer.

The obtained polyfunctional vinyl aromatic copolymer 1A had an Mn of 828, an Mw of 2,620, and an Mw/Mn of 3.17. 13C-NMR and 1H-NMR analysis were performed, and the polyfunctional vinyl aromatic copolymer A contained 13.8 mol % (15.1 wt %) of the structural unit derived from divinylbenzene, a total of 7.9 mol % (8.8 wt %) of the structural unit derived from ethyl vinyl benzene and 78.2 mol % (76.1 wt %) of the structural unit derived from indene. The content of the structural unit derived from divinylbenzene (corresponding to the structural unit (a1)) having a residual vinyl group contained in the polyfunctional vinyl aromatic copolymer 1A was 11.0 mol % (12.1 wt %).

In addition, as a result of TMA measurement, the cured product had a Tg of 182° C. and a softening temperature of 280° C. or higher. As a result of TGA measurement, the weight loss at 350° C. was 1.52 wt %. On the other hand, the compatibility with an epoxy resin was favorable 0.

The polyfunctional vinyl aromatic copolymer 1A was solvent-soluble o.

Example 2A 187.11 g of DVB-630 (0.90 mol of a divinylbenzene component and 0.53 mol of an ethyl vinyl benzene component), 182.37 g (1.57 mol) of indene, and 1.50 mol (172.5 mL) of N-propyl acetate were put into a 1.0 L reaction container, 40 mmol of a boron trifluoride diethyl ether complex (5.0 mL) was added at 70° C., and the mixture was reacted for 3.5 hours. After stopping the polymerization solution with a sodium hydrogen carbonate aqueous solution, an oil layer was washed with pure water three times and devolatilized at 60° C. under a reduced pressure, and a polyfunctional vinyl aromatic copolymer was collected by re-precipitation, filtration, and drying under strong stirring using 4,500 mL of methanol. The obtained polyfunctional vinyl aromatic copolymer was weighed and it was confirmed that 238.7 g of the polyfunctional vinyl aromatic copolymer 2A was obtained.

The obtained polyfunctional vinyl aromatic copolymer 2A had an Mn of 1,240, an Mw of 3,580, and an Mw/Mn of 2.89. The copolymer 2A contained 29.6 mol % (31.3 wt %) of the structural unit derived from divinylbenzene, a total of 17.9 mol % (19.2 wt %) of the structural unit derived from ethyl vinyl benzene and 52.5 mol % (49.5 wt %) of the structural unit derived from indene. The content of the structural unit derived from divinylbenzene having a residual vinyl group contained in the polyfunctional vinyl aromatic copolymer 2A was 19.5 mol % (20.6 wt %).

In addition, the cured product had a Tg 205° C. and a softening temperature of 280° C. or higher. As a result of TGA measurement, the weight loss at 350° C. was 0.96 wt %. On the other hand, the compatibility with an epoxy resin was o.

The polyfunctional vinyl aromatic copolymer 2A was solvent-soluble o.

Example 3A 31.16 g of DVB-630 (0.15 mol of a divinylbenzene component and 0.09 mol of an ethyl vinyl benzene component), 320.83 g (2.76 mol) of indene, and 1.50 mol (172.5 mL) of N-propyl acetate were put into a 1.0 L reaction container, 80 mmol of a boron trifluoride diethyl ether complex (10.0 mL) was added at 70° C., and the mixture was reacted for 3.0 hours. After stopping the polymerization solution with a sodium hydrogen carbonate aqueous solution, an oil layer was washed with pure water three times and devolatilized at 60° C. under a reduced pressure, and a polyfunctional vinyl aromatic copolymer was collected by re-precipitation, filtration, and drying under strong stirring using 4,500 mL of methanol. The obtained polyfunctional vinyl aromatic copolymer was weighed and it was confirmed that 256.3 g of the polyfunctional vinyl aromatic copolymer 3A was obtained.

The obtained polyfunctional vinyl aromatic copolymer 3A had an Mn of 659, an Mw of 2,560, and an Mw/Mn of 3.88. The copolymer 3A contained 5.1 mol % (5.8 wt %) of the structural unit derived from divinylbenzene, a total of 2.9 mol % (3.3 wt %) of the structural unit derived from ethyl vinyl benzene and 92.0 mol % (90.9 wt %) of the structural unit derived from indene. The content of the structural unit derived from divinylbenzene having a residual vinyl group contained in the polyfunctional vinyl aromatic copolymer 3A was 3.3 mol % (3.8 wt %).

In addition, the cured product had a Tg of 192° C. and a softening temperature of 280° C. or higher. As a result of TGA measurement, the weight loss at 350° C. was 1.63 wt %. On the other hand, the compatibility with an epoxy resin was o.

The polyfunctional vinyl aromatic copolymer 3A was solvent-soluble o.

Comparative Example 1A 249.41 g of DVB-630 (1.20 mol of a divinylbenzene component and 0.70 mol of an ethyl vinyl benzene component), 127.20 g (1.10 mol) of indene, and 1.50 mol (172.5 mL) of N-propyl acetate were put into a 1.0 L reaction container, 40 mmol of a boron trifluoride diethyl ether complex (5.0 mL) was added at 70° C., and the mixture was reacted for 3.0 hours. After stopping the polymerization solution with a sodium hydrogen carbonate aqueous solution, an oil layer was washed with pure water three times and devolatilized at 60° C. under a reduced pressure, and a polyfunctional vinyl aromatic copolymer was collected by re-precipitation, filtration, and drying under strong stirring using 4,500 mL of methanol. The obtained polyfunctional vinyl aromatic copolymer was weighed and it was confirmed that 253.6 g of the polyfunctional vinyl aromatic copolymer C1A was obtained.

The obtained polyfunctional vinyl aromatic copolymer C1A had an Mn of 1,430, an Mw of 5,030, and an Mw/Mn of 3.52. The copolymer C1A contained 40.2 mol % (41.6 wt %) of the structural unit derived from divinylbenzene, a total of 23.6 mol % (25.0 wt %) of the structural unit derived from ethyl vinyl benzene, and 36.2 mol % (33.4 wt %) of the structural unit derived from indene. The content of the structural unit derived from divinylbenzene having a residual vinyl group contained in the polyfunctional vinyl aromatic copolymer C1A was 26.5 mol % (27.4 wt %).

In addition, the cured product had a Tg of 168° C. and a softening temperature of 280° C. or higher. As a result of TGA measurement, the weight loss at 350° C. was 2.13 wt %. On the other hand, the compatibility with an epoxy resin was o.

The polyfunctional vinyl aromatic copolymer C1A was solvent-soluble o.

Comparative Example 2A 12.46 g of DVB-630 (0.06 mol of a divinylbenzene component and 0.04 mol of an ethyl vinyl benzene component), 337.44 g (2.90 mol) of indene, and 1.50 mol (172.5 mL) of N-propyl acetate were put into a 1.0 L reaction container, 80 mmol of a boron trifluoride diethyl ether complex (10.0 mL) was added at 70° C., and the mixture was reacted for 4.5 hours. After stopping the polymerization solution with a sodium hydrogen carbonate aqueous solution, an oil layer was washed with pure water three times and devolatilized at 60° C. under a reduced pressure, and a polyfunctional vinyl aromatic copolymer was collected by re-precipitation, filtration, and drying under strong stirring using 4,500 mL of methanol. The obtained polyfunctional vinyl aromatic copolymer was weighed and it was confirmed that 212.6 g of the polyfunctional vinyl aromatic copolymer C2A was obtained.

The obtained polyfunctional vinyl aromatic copolymer C2A had an Mn of 596, an Mw of 1,750, and an Mw/Mn of 2.93. The copolymer C2A contained 1.96 mol % (2.19 wt %) of the structural unit derived from divinylbenzene, a total of 1.16 mol % (1.32 wt %) of the structural unit derived from ethyl vinyl benzene, and 96.88 mol % (96.49 wt %) of the structural unit derived from indene. The content of the structural unit derived from divinylbenzene having a residual vinyl group contained in the polyfunctional vinyl aromatic copolymer C2A was 1.30 mol % (1.45 wt %).

In addition, as a result of TMA measurement, the cured product had a Tg of 178° C. and a softening temperature of 201° C. As a result of TGA measurement, the weight loss at 350° C. was 2.45 wt %. On the other hand, the compatibility with an epoxy resin was o.

The polyfunctional vinyl aromatic copolymer C2A was solvent-soluble o.

Comparative Example 3A 320.5 mL of DVB-810 (1.82 mol of a divinylbenzene component and 0.43 mol of an ethyl vinyl benzene component), 0.28 mol (36.9 mL) of n-butyl acetate, and 140 mL of toluene were put into a 1.0 L reaction container, a solution prepared by dissolving 40 mmol of methanesulfonic acid in 0.12 mol (15.7 mL) of n-butyl acetate was added at 70° C., and the mixture was reacted for 6 hours. After stopping the polymerization solution with calcium hydroxide, filtration was performed using activated alumina as a filtering aid. Then, devolatilization under a reduced pressure was performed at 60° C., and 22.6 g of a polyfunctional vinyl aromatic copolymer C3A was obtained.

The obtained polyfunctional vinyl aromatic copolymer C3A had an Mn of 1,085, an Mw of 12,400, and an Mw/Mn of 11.4. The polyfunctional vinyl aromatic copolymer F contained 84.0 mol % (83.8 wt %) of the structural unit derived from divinylbenzene and a total of 16.0 mol % (16.2 wt %) of the structural unit derived from ethyl vinyl benzene. The content of the structural unit derived from divinylbenzene having a residual vinyl group contained in the polyfunctional vinyl aromatic copolymer C3A was 53.8 mol % (53.6 wt %).

In addition, the cured product had a Tg of 82° C. and a softening temperature of 93° C. As a result of TGA measurement, the weight loss at 350° C. was 8.25 wt %. On the other hand, the compatibility with an epoxy resin was o.

The polyfunctional vinyl aromatic copolymer C3A was solvent-soluble o.

Example 4A 245 g of cyclohexane, 2.5 g of THF, 10 g of styrene, 40 g of 1,3-butadiene, and 0.10 g of the copolymer 1A obtained in Example 1A were put into an autoclave reaction container purged with nitrogen and having an internal volume of 0.5 L. At 25° C., 5 g of a cyclohexane solution containing 50 mg of sec-butyl lithium was added to initiate polymerization. The temperature of the reaction solution increased due to heat of polymerization, and the maximum temperature reached 85° C.

After it was confirmed that the polymerization conversion rate reached 99%, 50 mg of isopropanol was added to stop the polymerization, and 2,6-di-tert-butyl-p-cresol (BHT) was added to the reaction solution. Then, the solvent was removed by steam stripping to obtain a conjugated diene copolymer 4A. Table 1A shows physical properties of the obtained conjugated diene copolymer 4A.

Example 5A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.10 g of the copolymer 1A obtained in Example 1A was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 85° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 5A. Table 1A shows physical properties of the obtained conjugated diene copolymer 5A.

Example 6A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.050 g of the copolymer 2A obtained in Example 2 was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 83° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 6A. Table 1A shows physical properties of the obtained conjugated diene copolymer 6A.

Example 7A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.30 g of the copolymer 3A obtained in Example 3A was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 81° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 7A. Table 1A shows physical properties of the obtained conjugated diene copolymer 7A.

Comparative Example 4A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.0375 g of the copolymer C1A obtained in Comparative Example 1A was then added over 30 minutes to prepare a polyfunctional anionic polymerization initiator. The prepared polyfunctional anionic polymerization initiator was generally soluble in cyclohexane, but gel formation was also observed visually. 10 g of styrene and 40 g of 1,3-butadiene from which impurities were removed in advance were added to initiate polymerization. The temperature of the reaction solution increased due to heat of polymerization, and the maximum temperature reached 82° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C4A. Table 1A shows physical properties of the obtained conjugated diene copolymer C4A.

Comparative Example 5A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.75 g of the copolymer C2A obtained in Comparative Example 2A was then added over 30 minutes to prepare a polyfunctional anionic polymerization initiator. The prepared polyfunctional anionic polymerization initiator was soluble in cyclohexane, and no gel formation was observed. 10 g of styrene and 40 g of 1,3-butadiene from which impurities were removed in advance were added to initiate polymerization. The temperature of the reaction solution increased due to heat of polymerization, and the maximum temperature reached 78° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C5A. Table 1A shows physical properties of the obtained conjugated diene copolymer C5A.

Comparative Example 6A 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.020 g of the copolymer C3A obtained in Comparative Example 3A was then added over 30 minutes to prepare a polyfunctional anionic polymerization initiator. The prepared polyfunctional anionic polymerization initiator was partially soluble in cyclohexane, and gel formation was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C6A. Table 1A shows physical properties of the obtained conjugated diene copolymer C6A.

In Table 1A, the diene copolymer is a conjugated diene copolymer. The same applies to other tables.

TABLE 1A

| | Polyfunctional vinyl aromatic copolymer | Modifying agent | Conjugated diene copolymer | Mw (10,000) | Mooney viscosity | Microgel |
|---|---|---|---|---|---|---|
| Example 4A | 1A | — | 4A | 38 | 46 | ○ |
| Example 5A | 1A | — | 5A | 39 | 47 | ○ |
| Example 6A | 2A | BTESPA | 6A | 43 | 52 | ○ |
| Example 7A | 3A | BTESPA | 7A | 41 | 49 | ○ |
| Comparative Example 4A | C1A | — | C4A | 39 | 41 | x |
| Comparative Example 5A | C2A | — | C5A | 28 | 31 | ○ |
| Comparative Example 6A | C3A | — | C6A | 40 | 44 | x |

Example 8A

The conjugated diene copolymer 4A, a process oil, carbon black, zinc oxide, stearic acid and an antioxidant were kneaded using a Labo Plastomill at 155° C. and 60 rpm for 4 minutes.

Sulfur and a vulcanization accelerator were added to the kneaded product obtained by the above kneading, and the mixture was kneaded using a Labo Plastomill at 70° C. and 60 rpm for 1 minute and vulcanized to obtain a crosslinked rubber 8A.

Table 2A shows formulation proportions of additives. In addition, Table 3A shows physical properties of the crosslinked rubber 8A.

Examples 9A to 11A, and Comparative Examples 7A to 9A

Crosslinked rubbers 9A to 11A, and C7A to C9A were obtained in the same manner as in Example 8A except that the conjugated diene copolymers 5A, 6A, 7A, C4A, C5A, and C6A synthesized in the above examples and comparative examples were used in place of the conjugated diene copolymer 4A.

Table 3A shows the types of the conjugated diene copolymers used and physical properties of the obtained crosslinked rubbers 9A to 11A, and C7A to C9A.

TABLE 2A

| | |
|---|---|
| Copolymer rubber | 100.0 |
| Process oil | 37.5 |
| Zinc oxide | 3.0 |
| Sulfur | 1.8 |
| Stearic acid | 1.0 |
| Silica | 65.0 |
| Carbon black | 5.0 |
| Vulcanization accelerator | 1.5 |
| Antioxidant | 1.0 |

Here, in Table 2A, additives used are as follows.

Process oil: Diana Process Oil AC-12 commercially available from Idemitsu Kosan Co., Ltd.

Sulfur: sulfur powder commercially available from Tsurumi Chemical Industry Co., Ltd.

Zinc oxide: Zinc oxide No. 1 commercially available from

Mitsui Mining & Smelting Co., Ltd.

Stearic acid: commercially available from NOF Corporation

Silica: ULTRASIL VN3 commercially available from Degussa AG

Carbon black: Niteron #300 commercially available from Nippon Steel Carbon Co., Ltd.

Vulcanization accelerator: N-tert-butylbenzothiazole-2-sulfenamide

Antioxidant: NOCCELER NS commercially available from Ouchi Shinko Chemical Industrial Co., Ltd.

TABLE 3A

| | Conjugated diene copolymer | Cross-linked rubber | Tensile strength index | Wear resistance index |
|---|---|---|---|---|
| Example 8A | 4A | 8A | 107 | 106 |
| Example 9A | 5A | 9A | 109 | 108 |
| Example 10A | 6A | 10A | 116 | 117 |
| Example 11A | 7A | 11A | 115 | 118 |
| Comparative Example 7A | C4A | C7A | 102 | 91 |
| Comparative Example 8A | C5A | C8A | 100 | 100 |
| Comparative Example 9A | C6A | C9A | 101 | 87 |

In Table 3A, the tensile strength index and the wear resistance index are based on 100 which is the numerical value of the crosslinked rubber of Comparative Example 7A. In Table 3A, it was found that the rubber crosslinked material of the present invention using the polyfunctional vinyl aromatic copolymer of the present invention had the same or higher processability as or than when divinylbenzene which is a known branching agent was used, and in vulcanized rubber containing carbon black, the tensile strength and wear resistance were excellent.

Examples of Second Invention

Example 1B 9.30 g of DVB-630 (0.045 mol of a divinylbenzene component and 0.026 mol of an ethyl vinyl benzene component), 148.79 g (1.43 mol) of styrene, and 1.50 mol (172.5 mL) of N-propyl acetate were put into a 1.0 L reaction container, 200 mmol of a boron trifluoride diethyl ether complex (25.1 mL) was added at 50° C., and the mixture was reacted for 2.5 hours. After stopping the polymerization solution with a sodium hydrogen carbonate aqueous solution, an oil layer was washed with pure water three times and devolatilized at 60° C. under a reduced pressure to collect a copolymer, and 90.1 g of a polyfunctional vinyl aromatic copolymer 1B was obtained.

The obtained polyfunctional vinyl aromatic copolymer 1B had an Mn of 4,140, an Mw of 9,550, and an Mw/Mn of 2.31. $^{13}$C-NMR and $^{1}$H-NMR analysis were performed, and the polyfunctional vinyl aromatic copolymer A contained 3.0 mol % (3.7 wt %) of the structural unit derived from divinylbenzene, 1.4 mol % (1.8 wt %) of the structural unit derived from ethyl vinyl benzene, and 95.5 mol % (94.5 wt %) of the structural unit derived from styrene. Since the content of the crosslinked structural unit (a2) derived from the divinyl aromatic compound represented by Formula (2) was 0.24 mol % (0.30 wt %), the degree of crosslinking was 0.08. In addition, since the content of the structural unit (a1) derived from divinylbenzene having a residual vinyl group contained in the polyfunctional vinyl aromatic copolymer 1B was 2.76 mol % (3.40 wt %), the molar fraction of the vinyl-group-containing structural unit (a1) with respect to the total amount of the structural units (a) and (b) was 0.028.

In addition, as a result of TMA measurement, the cured product had a Tg of 105° C. and a softening temperature of 128° C.

As a result of TGA measurement, the weight loss at 350° C. was 1.36 wt %. When a sample prepared by dissolving 0.5 g of the polyfunctional vinyl aromatic copolymer 1B in 100 g of toluene was put into a quartz cell, and the Haze (turbidity) thereof was measured using an integrating sphere type light transmittance measuring device using toluene as a reference sample, the Haze value was 0.00.

Example 2B 18.60 g of DVB-630 (0.090 mol of a divinylbenzene component and 0.053 mol of an ethyl vinyl benzene component), 141.34 g (1.36 mol) of styrene, and 1.00 mol (115.0 mL) of N-propyl acetate were put into a 1.0 L reaction container, 50 mmol of a boron trifluoride diethyl ether complex (6.1 mL) was added at 60° C., and the mixture was reacted for 3.0 hours. After stopping the polymerization solution with a sodium hydrogen carbonate aqueous solution, an oil layer was washed with pure water three times and devolatilized at 60° C. under a reduced pressure to collect a copolymer, and 95.8 g of a polyfunctional vinyl aromatic copolymer 2B was obtained.

The polyfunctional vinyl aromatic copolymer 2B had an Mn of 2,620, an Mw of 11,800, and an Mw/Mn of 4.51 and contained 7.37 mol % (8.97 wt %) of the structural unit derived from divinylbenzene, 3.34 mol % (4.12 wt %) of the structural unit derived from ethyl vinyl benzene, and 89.3 mol % (86.9 wt %) of the structural unit derived from styrene. The content of the crosslinked structural unit (a2) was 1.55 mol % (1.82 wt %), the degree of crosslinking was 0.21, the content of the vinyl-group-containing structural unit (a1) was 5.82 mol % (7.15 wt %), and the molar fraction of the structural unit (a1) was 0.058.

In addition, the cured product had a Tg of 158° C. and a softening temperature of 265° C. The weight loss at 350° C. was 1.28 wt %.

The Haze value of the polyfunctional vinyl aromatic copolymer 2B was 0.01.

Example 3B 31.00 g of DVB-630 (0.150 mol of a divinylbenzene component and 0.088 mol of an ethyl vinyl benzene component), 131.43 g (1.262 mol) of styrene, and 1.50 mol (172.5 mL) of N-propyl acetate were put into a 1.0 L reaction container, 60 mmol of a boron trifluoride diethyl ether complex (7.5 mL) was added at 55° C., and the mixture was reacted for 5.0 hours. After stopping the polymerization solution with a sodium hydrogen carbonate aqueous solution, an oil layer was washed with pure water three times and devolatilized at 60° C. under a reduced pressure, a copolymer was collected, and 96.3 g of a polyfunctional vinyl aromatic copolymer 3B was obtained.

The polyfunctional vinyl aromatic copolymer 3B had an Mn of 2,950, an Mw of 13,400, and an Mw/Mn of 4.54, and contained 11.63 mol % (13.91 wt %) of the structural unit derived from divinylbenzene, a total of 5.87 mol % (7.13 wt %) of the structural unit derived from ethyl vinyl benzene and 82.50 mol % (78.96 wt %) of the structural unit derived from styrene. The content of the crosslinked structural unit (a2) was 3.14 mol % (3.76 wt %) and the degree of crosslinking was 0.27. In addition, the content of the structural unit (a1) was 8.49 mol % (10.16 wt %), and the molar fraction of the vinyl-group-containing structural unit (a1) was 0.085.

In addition, the cured product had a Tg of 165° C., a softening temperature of 280° C. or higher, and a weight loss at 350° C. of 1.46 wt %.

The Haze value of the polyfunctional vinyl aromatic copolymer 3B was 0.04.

Example 4B 46.49 g of DVB-630 (0.225 mol of a divinylbenzene component and 0.132 mol of an ethyl vinyl benzene component), 119.03 g (1.143 mol) of styrene, and 1.50 mol (172.5 mL) of N-propyl acetate were put into a 1.0 L reaction container, 60 mmol of a boron trifluoride diethyl ether complex (7.54 mL) was added at 50° C., and the mixture was reacted for 3.5 hours. After stopping the polymerization solution with a sodium hydrogen carbonate aqueous solution, an oil layer was washed with pure water three times and devolatilized at 60° C. under a reduced pressure, a copolymer was collected, and 96.10 g of a polyfunctional vinyl aromatic copolymer 4B was obtained.

The polyfunctional vinyl aromatic copolymer 4B had an Mn of 3,870, an Mw of 23,600, and an Mw/Mn of 6.10, and contained 20.64 mol % (23.98 wt %) of the structural unit derived from divinylbenzene, 9.09 mol % (10.72 wt %) of the structural unit derived from ethyl vinyl benzene and 70.27 mol % (65.30 wt %) of the structural unit derived from styrene. The content of the crosslinked structural unit (a2) was 6.61 mol % (7.67 wt %), the degree of crosslinking was 0.32, the content of the vinyl-group-containing structural unit (a1) was 14.04 mol % (16.31 wt %), and the molar fraction of the vinyl-group-containing structural unit (a1) was 0.140.

In addition, the cured product had a Tg of 178° C., a softening temperature of 280° C. or higher, and a weight loss at 350° C. of 1.53 wt %.

The Haze value of the polyfunctional vinyl aromatic copolymer 4B was 0.07.

Example 5B 77.49 g of DVB-630 (0.375 mol of a divinylbenzene component and 0.220 mol of an ethyl vinyl benzene component), 94.23 g (0.905 mol) of styrene, and 1.57 mol (180.2 mL) of N-propyl acetate were put into a 1.0 L reaction container, 23.3 mmol of a boron trifluoride diethyl ether complex (2.93 mL) was added at 50° C., and the mixture was reacted for 5.25 hours. After stopping the polymerization solution with a sodium hydrogen carbonate aqueous solution, an oil layer was washed with pure water three times and devolatilized at 60° C. under a reduced pressure to collect a copolymer, and 76.19 g of a polyfunctional vinyl aromatic copolymer 5B was obtained.

The polyfunctional vinyl aromatic copolymer 5B had an Mn of 4,230, an Mw of 26,200, and an Mw/Mn of 6.19, and contained 39.29 mol % (43.12 wt %) of the structural unit derived from divinylbenzene, 15.08 mol % (16.81 wt %) of the structural unit derived from ethyl vinyl benzene and 45.63 mol % (40.07 wt %) of the structural unit derived from styrene.

The content of the crosslinked structural unit (a2) was 16.89 mol % (18.54 wt %), the degree of crosslinking was 0.43, the content of the vinyl-group-containing structural unit (a1) was 22.39 mol % (24.58 wt %), and the molar fraction of the structural unit (a1) was 0.224.

In addition, the cured product was Tg-less, the softening temperature was 280° C. or higher, and the weight loss at 350° C. was 1.61 wt %.

The Haze value of the polyfunctional vinyl aromatic copolymer 5B was 0.09.

Comparative Example 1B 320.5 mL of DVB-810 (1.82 mol of a divinylbenzene component and 0.43 mol of an ethyl vinyl benzene component), 0.28 mol (36.9 mL) of n-butyl acetate, and 140 mL of toluene were put into a 1.0 L reaction container, a solution prepared by dissolving 40 mmol of methanesulfonic acid in 0.12 mol (15.7 mL) of n-butyl acetate was added at 70° C., and the mixture was reacted for 6 hours. After stopping the polymerization solution with calcium hydroxide, filtration was performed using activated alumina as a filtering aid. Then, devolatilization under a reduced pressure was performed at 60° C. and 22.6 g of a polyfunctional vinyl aromatic copolymer C1B was obtained.

The polyfunctional vinyl aromatic copolymer C1B had an Mn of 1,085, an Mw of 12,400, and an Mw/Mn of 11.4, and contained 84.0 mol % (83.8 wt %) of the structural unit derived from divinylbenzene and a total of 16.0 mol % (16.2 wt %) of the structural unit derived from ethyl vinyl benzene. The content of the crosslinked structural unit (a2) was 2.60 mol % (2.59 wt %), the degree of crosslinking was 0.031, the content of the vinyl-group-containing structural unit (a1) was 11.40 mol % (11.37 wt %), and the molar fraction of the vinyl-group-containing structural unit (a1) was 0.114.

In addition, the cured product had a Tg of 82° C., a softening temperature of 93° C., and a weight loss at 350° C. of 8.25 wt %. On the other hand, the compatibility with an epoxy resin was o.

The Haze value of the polyfunctional vinyl aromatic copolymer C1B was 0.02.

Comparative Example 2B 1.5 mol (195.3 g) of divinylbenzene, 0.88 mol (114.7 g) of ethyl vinyl benzene, 12.6 mol (1,314.3 g) of styrene, and 15.0 mol (1,532.0 g) of N-propyl acetate were put into a 5.0 L reaction container, 600 mmol of a boron trifluoride diethyl ether complex was added at 70° C. and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 820.8 g of the copolymer C2B was obtained.

The copolymer C2B had an Mn 1,490, an Mw of 12,600, and an Mw/Mn of 8.44. The copolymer G contained 11.3 mol % (13.5 wt %) of the structural unit derived from divinylbenzene, 5.79 mol % (7.04 wt %) of the structural unit derived from ethyl vinyl benzene and 82.9 mol % (79.4 wt %) of the structural unit derived from styrene.

The content of the crosslinked structural unit (a2) was 5.86 mol % (7.02 wt %), the degree of crosslinking was 0.52, the content of the vinyl-group-containing structural unit (a1) was 5.41 mol % (6.48 wt %), and the molar fraction of the vinyl-group-containing structural unit (a1) was 0.054.

In addition, the cured product had a Tg of 162° C., a softening temperature of 280° C. or higher, and a weight loss at 350° C. of 1.86 wt %.

The Haze value of the polyfunctional vinyl aromatic copolymer C2B was 0.14.

Comparative Example 3B 2.25 mol (292.9 g) of divinylbenzene, 1.32 mol (172.0 g) of ethyl vinyl benzene, 11.4 mol (1,190.3 g) of styrene, and 15.0 mol (1,532.0 g) of N-propyl acetate were put into a 5.0 L reaction container, 600 mmol of a boron trifluoride diethyl ether complex was added at 70° C. and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 860.8 g of the copolymer C3B was obtained.

The copolymer C3B had an Mn of 2,060, an Mw of 30,700, and an Mw/Mn of 14.9. The copolymer H contained 20.92 mol % (24.29 wt %) of the structural unit derived from divinylbenzene, 9.06 mol % (10.68 wt %) of the structural unit derived from ethyl vinyl benzene, and 70.02 mol % (65.03 wt %) of the structural unit derived from styrene.

The content of the crosslinked structural unit (a2) was 11.30 mol % (13.12 wt %), the degree of crosslinking was 0.54, the content of the vinyl-group-containing structural unit (a1) was 9.62 mol % (11.17 wt %), and the molar fraction of the vinyl-group-containing structural unit (a1) was 0.096.

In addition, the cured product was Tg-less, the softening temperature was 280° C. or higher, and the weight loss at 350° C. was 2.11 wt %.

The Haze value of the polyfunctional vinyl aromatic copolymer C3B was 0.17.

Comparative Example 4B 3.1 mol (404.5 g) of divinylbenzene, 1.8 mol (237.6 g) of ethyl vinyl benzene, 7.5 mol (780.7 g) of styrene, and 13.0 mol (1,325.7 g) of N-propyl acetate were put into a 5.0 L reaction container, 193 mmol of a boron trifluoride diethyl ether complex was added at 70° C., and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 689.2 g of the copolymer C4B was obtained.

The copolymer C4B had an Mn of 2,940, an Mw of 39,500, and an Mw/Mn of 13.4. The copolymer C4B contained 36.8 mol % (40.7 wt %) of the structural unit derived from divinylbenzene, 14.5 mol % (16.3 wt %) of the structural unit derived from ethyl vinyl benzene, and 48.6 mol % (43.0 wt %) of the structural unit derived from styrene.

The content of the crosslinked structural unit (a2) was 20.99 mol % (23.20 wt %), the degree of crosslinking was 0.57, the content of the vinyl-group-containing structural unit (a1) was 15.84 mol % (17.50 wt %), and the molar fraction of the vinyl-group-containing structural unit (a1) was 0.158.

In addition, the cured product was Tg-less, the softening temperature was 280° C. or higher, and the weight loss at 350° C. was 2.23 wt %.

The Haze value of the polyfunctional vinyl aromatic copolymer C4B was 0.21.

Example 6B 245 g of cyclohexane, 2.5 g of THF, 10 g of styrene, 40 g of 1,3-butadiene, and 0.50 g of the polyfunctional vinyl aromatic copolymer 1B obtained in Example 1B were put into an autoclave reaction container purged with nitrogen and having an internal volume of 0.5 L. At 25° C., 5 g of a cyclohexane solution containing 50 mg of sec-butyl lithium was added to initiate polymerization. The temperature of the reaction solution increased due to heat of polymerization, and the maximum temperature reached 85° C.

After it was confirmed that the polymerization conversion rate reached 99%, 50 mg of isopropanol was added to stop the polymerization, and 2,6-di-tert-butyl-p-cresol (BHT) was added to the reaction solution. Then, the solvent was removed by steam stripping to obtain a conjugated diene copolymer 6B. Table 1B shows physical properties of the obtained conjugated diene copolymer 6B.

Example 7B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.50 g of the polyfunctional vinyl aromatic copolymer 1B obtained in Example 1B was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 85° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 7B. Table 1B shows physical properties of the obtained conjugated diene copolymer 7B.

Example 8B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.30 g of the polyfunctional vinyl aromatic copolymer 2B obtained in Example 2B was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 85° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 8B. Table 1B shows physical properties of the obtained conjugated diene copolymer 8B.

Example 9B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.50 g of the polyfunctional vinyl aromatic copolymer 1B obtained in Example 1B was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 81° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 9B. Table 1B shows physical properties of the obtained conjugated diene copolymer 9B.

Example 10B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.35 g of the polyfunctional vinyl aromatic copolymer 2B obtained in Example 2B was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 81° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 10B. Table 1B shows physical properties of the obtained conjugated diene copolymer 10B.

Example 11B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.030 g of the polyfunctional vinyl aromatic copolymer 3B obtained in Example 3B was then added over 30 minutes to prepare a polyfunctional anionic polymerization initiator. The prepared polyfunctional anionic polymerization initiator was generally soluble in cyclohexane, but gel formation was also observed visually. 10 g of styrene and 40 g of 1,3-butadiene from which impurities were removed in advance were added to initiate polymerization. The temperature of the reaction solution increased due to heat of polymerization, and the maximum temperature reached 82° C.

After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution. After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 11B. Table 1B shows physical properties of the obtained conjugated diene copolymer 11B.

Example 12B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., 45 g of a cyclohexane solution containing 0.25 g of the polyfunctional vinyl aromatic copolymer 4B obtained in Example 4B was then added over 30 minutes to prepare a polyfunctional anionic polymerization initiator. The prepared polyfunctional anionic polymerization initiator was soluble in cyclohexane, and no gel formation was observed. 10 g of styrene and 40 g of 1,3-butadiene from which impurities were removed in advance were added to initiate polymerization. The temperature of the reaction solution increased due to heat of polymerization, and the maximum temperature reached 81° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 12B. Table 1B shows physical properties of the obtained conjugated diene copolymer 12B.

Example 13B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., 45 g of a cyclohexane solution containing 0.15 g of the polyfunctional vinyl aromatic copolymer 5B obtained in Example 5B was then added over 30 minutes to prepare a polyfunctional anionic polymerization initiator. The prepared polyfunctional anionic polymerization initiator was partially soluble in cyclohexane, and gel formation was observed. 10 g of styrene and 40 g of 1,3-butadiene from which impurities were removed in advance were added to initiate polymerization. The temperature of the reaction solution increased due to heat of polymerization, and the maximum temperature reached 81° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 13B. Table 1B shows physical properties of the obtained conjugated diene copolymer 13B.

Comparative Example 5B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.5 g of the polyfunctional vinyl aromatic copolymer C1B obtained in Comparative Example 1B was then added over 30 minutes to prepare a polyfunctional anionic polymerization initiator. The prepared polyfunctional anionic polymerization initiator was partially soluble in cyclohexane, and gel formation was observed. 10 g of styrene and 40 g of 1,3-butadiene from which impurities were removed in advance were added to initiate polymerization. The temperature of the reaction solution increased due to heat of polymerization, and the maximum temperature reached 84° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C5B. Table 1B shows physical properties of the obtained conjugated diene copolymer C5B.

Comparative Example 6B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.030 g of the polyfunctional vinyl aromatic copolymer C2B obtained in Comparative Example 2B was then added over 30 minutes to prepare a polyfunctional anionic polymerization initiator. The prepared polyfunctional anionic polymerization initiator was generally soluble in cyclohexane, but gel formation was also observed visually. 10 g of styrene and 40 g of 1,3-butadiene from which impurities were removed in advance were added to initiate polymerization. The temperature of the reaction solution increased due to heat of polymerization, and the maximum temperature reached 83° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C6B. Table 1B shows physical properties of the obtained conjugated diene copolymer C6B.

Comparative Example 7B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.25 g of the polyfunctional vinyl aromatic copolymer C3B obtained in Comparative Example 3B was then added over 30 minutes to prepare a polyfunctional anionic polymerization initiator. The prepared polyfunctional anionic polymerization initiator was soluble in cyclohexane, and no gel formation was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C7B. Table 1B shows physical properties of the obtained conjugated diene copolymer C7B.

Comparative Example 8B 200 g of cyclohexane and 2.5 g of THF were put into an autoclave reaction container purged with nitrogen, 5 g of a cyclohexane solution containing 50 mg (0.78 mmol) n-butyllithium as a pure content was added at 50° C., and 45 g of a cyclohexane solution containing 0.15 g of the polyfunctional vinyl aromatic copolymer C4B obtained in Comparative Example 4B was then added over 30 minutes to prepare a polyfunctional anionic polymerization initiator. The prepared polyfunctional anionic polymerization initiator was partially soluble in cyclohexane, and gel formation was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C8B. Table 1B shows physical properties of the obtained conjugated diene copolymer C8B.

TABLE 1B

| | Polyfunctional vinyl aromatic copolymer | Modifying agent | Conjugated diene copolymer | Mw (10,000) | Vinyl bond amount (%) | Mooney viscosity | Haze |
|---|---|---|---|---|---|---|---|
| Example 6B | 1B | — | 6B | 41 | 57 | 46 | 0.00 |
| Example 7B | 1B | — | 7B | 43 | 61 | 47 | 0.01 |
| Example 8B | 2B | — | 8B | 42 | 64 | 44 | 0.01 |
| Example 9B | 1B | BTESPA | 9B | 45 | 61 | 54 | 0.01 |
| Example 10B | 2B | BTESPA | 10B | 47 | 62 | 56 | 0.02 |
| Example 11B | 3B | BTESPA | 11B | 39 | 63 | 42 | 0.07 |
| Example 12B | 4B | — | 12B | 37 | 67 | 39 | 0.18 |
| Example 13B | 5B | — | 13B | 34 | 70 | 35 | 0.21 |
| Comparative Example 5B | C1B | — | C5B | 27 | 46 | 30 | 0.14 |
| Comparative Example 6B | C2B | — | C6B | 36 | 69 | 33 | 1.53 |
| Comparative Example 7B | C3B | — | C7B | 35 | 68 | 31 | 2.11 |
| Comparative Example 8B | C4B | — | C8B | 33 | 70 | 32 | 4.26 |

Example 14B

The conjugated diene copolymer 6B, a process oil, carbon black, zinc oxide, stearic acid and an antioxidant were kneaded using a Labo Plastomill at 155° C. and 60 rpm for 4 minutes.

Sulfur and a vulcanization accelerator were added to the kneaded product obtained by the above kneading, and the mixture was kneaded using a Labo Plastomill at 70° C. and 60 rpm for 1 minute and vulcanized to obtain a crosslinked rubber 14B.

The additives and formulation proportions are the same as those in Table 2A. In addition, Table 3B shows physical properties of the crosslinked rubber 14B.

Examples 15B to 21B, and Comparative Examples 9B to 12B

Crosslinked rubbers 14B to 21B, and C9B to C12B were obtained in the same manner as in Example 14B except that the conjugated diene copolymers 7B to 13B, and C5B to C8B synthesized in the above examples and comparative examples were used in place of the conjugated diene copolymer 6B.

Table 3B shows the types of the conjugated diene copolymers used and physical properties of the obtained crosslinked rubbers 14B to 21B, and C9B to C12B.

TABLE 3B

| | Conjugated diene copolymer | Crosslinked rubber | Amount of bound rubber (%) | Tensile strength index | Wear resistance index |
|---|---|---|---|---|---|
| Example 14B | 6B | 14B | 22 | 108 | 111 |
| Example 15B | 7B | 15B | 24 | 116 | 115 |
| Example 16B | 8B | 16B | 21 | 102 | 105 |
| Example 17B | 9B | 17B | 78 | 117 | 118 |
| Example 18B | 10B | 18B | 75 | 123 | 122 |
| Example 19B | 11B | 19B | 68 | 107 | 108 |
| Example 20B | 12B | 20B | 19 | 100 | 100 |
| Example 21B | 13B | 21B | 18 | 91 | 87 |
| Comparative Example 9B | C5B | C9B | 15 | 86 | 83 |
| Comparative Example 10B | C6B | C10B | 14 | 87 | 85 |
| Comparative Example 11B | C7B | C11B | 13 | 84 | 83 |
| Comparative Example 12B | C8B | C12B | 14 | 81 | 80 |

In Table 3B, it was found that the rubber crosslinked material of the present invention using the polyfunctional vinyl aromatic copolymer of the present invention had the same or higher processability as or than when divinylbenzene which is a known branching agent was used, and in the vulcanized rubber containing carbon black, the tensile strength and wear resistance were excellent.

Examples of Third Invention

Example 1C 31.00 g of DVB-630 (0.150 mol of a divinylbenzene component and 0.088 mol of an ethyl vinyl benzene (a mixture of an m-form and a p-form) component), 65.72 g (0.631 mol) of styrene, 70.80 g (0.631 mol) of diisobutylene, 60 mmol (6.90 mL) of N-propyl acetate, and 48.55 g (0.527 mol) of toluene were put into a 500 mL reaction container, 15.2 mmol of a boron trifluoride diethyl ether complex (1.91 mL) was added at 70° C., and the mixture was reacted for 2.0 hours. After stopping the polymerization solution with a sodium hydrogen carbonate aqueous solution, an oil layer was washed with pure water three times and devolatilized at 60° C. under a reduced pressure, a copolymer was collected, and 60.6 g of a polyfunctional vinyl aromatic copolymer 1C was obtained.

The obtained polyfunctional vinyl aromatic copolymer 1C had an Mn of 941, an Mw of 2,850, and an Mw/Mn of 3.03. $^{13}$C-NMR and $^{1}$H-NMR analysis were performed, the polyfunctional vinyl aromatic copolymer A contained 19.0 mol % (21.8 wt %) of the structural unit derived from divinylbenzene, 8.3 mol % (9.6 wt %) of the structural unit derived from ethyl vinyl benzene, 48.6 mol % (44.6 wt %) of the structural unit derived from styrene, and 24.2 mol % (24.0 wt %) of the structural unit derived from diisobutylene. Since the content of the crosslinked structural unit (a2) derived from the divinyl aromatic compound represented by Formula (2) was 4.6 mol % (5.2 wt %), the degree of crosslinking (a 2/a) was 0.24. In addition, since the content of the structural unit (a1) derived from divinylbenzene having a residual vinyl group contained in the polyfunctional vinyl aromatic copolymer 1C was 14.4 mol % (16.5 wt %), the molar fraction of the vinyl-group-containing structural unit (a1) with respect to the total amount of the structural units (a), (b), and (c) was 0.144.

In addition, as a result of TMA measurement, the cured product had a Tg of 167° C. and a softening temperature of 280° C. or higher.

As a result of TGA measurement, the weight loss at 350° C. was 1.41 wt %. When a sample prepared by dissolving 0.5 g of the polyfunctional vinyl aromatic copolymer 1C in 100 g of toluene was put into a quartz cell, and the Haze (turbidity) thereof was measured using an integrating sphere type light transmittance measuring device using toluene as a reference sample, the Haze value was 0.02.

Example 2C 46.49 g of DVB-630 (0.225 mol of a divinylbenzene component and 0.132 mol of an ethyl vinyl benzene component), 53.33 g (0.512 mol) of styrene, 70.80 g (0.631 mol) of diisobutylene, 60 mmol (6.90 mL) of N-propyl acetate, and 48.55 g (0.527 mol) of toluene were put into a 500 mL reaction container, 10.0 mmol of a boron trifluoride diethyl ether complex (1.26 mL) was added at 70° C., and the mixture was reacted for 2.0 hours. After stopping the polymerization solution with a sodium hydrogen carbonate aqueous solution, an oil layer was washed with pure water three times and devolatilized at 60° C. under a reduced pressure, a copolymer was collected, and 66.4 g of a polyfunctional vinyl aromatic copolymer 2C was obtained.

The obtained polyfunctional vinyl aromatic copolymer 2C had an Mn of 1,240, an Mw of 4,980, and an Mw/Mn of 4.02. $^{13}$C-NMR and $^{1}$H-NMR analysis were performed, and the polyfunctional vinyl aromatic copolymer B contained 28.2 mol % (31.5 wt %) of the structural unit derived from divinylbenzene, 12.2 mol % (13.8 wt %) of the structural unit derived from ethyl vinyl benzene, 37.6 mol % (33.6 wt %) of the structural unit derived from styrene, and 22.0 mol % (21.1 wt %) of the structural unit derived from diisobutylene. Since the content of the crosslinked structural unit (a2) derived from the divinyl aromatic compound represented by Formula (2) was 7.6 mol % (8.5 wt %), the degree of crosslinking was 0.27. In addition, since the content of the structural unit (a1) derived from divinylbenzene having a residual vinyl group contained in the polyfunctional vinyl aromatic copolymer 2C was 20.6 mol % (23.0 wt %), the molar fraction of the vinyl-group-containing structural unit (a1) with respect to the total amount of the structural units (a), (b), and (c) was 0.206.

In addition, as a result of TMA measurement, the cured product had a Tg of 176° C. and a softening temperature of 280° C. or higher.

As a result of TGA measurement, the weight loss at 350° C. was 1.32 wt %. When a sample prepared by dissolving 0.5 g of the polyfunctional vinyl aromatic copolymer 2C in 100 g of toluene was put into a quartz cell, and the Haze (turbidity) thereof was measured using an integrating sphere type light transmittance measuring device using toluene as a reference sample, the Haze value was 0.03.

Example 3C 62.00 g of DVB-630 (0.300 mol of a divinylbenzene component and 0.176 mol of an ethyl vinyl benzene component), 40.92 g (0.393 mol) of styrene 70.80 g (0.631 mol) of diisobutylene, 60 mmol (6.90 mL) of N-propyl acetate, and 48.55 g (0.527 mol) of toluene were put into a 500 mL reaction container, 8.2 mmol of a boron trifluoride diethyl ether complex (1.03 mL) was added at 70° C., and the mixture was reacted for 1.5 hours. After stopping the polymerization solution with a sodium hydrogen carbonate aqueous solution, an oil layer was washed with pure water three times and devolatilized at 60° C. under a reduced pressure, a copolymer was collected, and 56.3 g of a polyfunctional vinyl aromatic copolymer 3C was obtained.

The obtained polyfunctional vinyl aromatic copolymer 3C had an Mn of 1,430, an Mw of 5,490, and an Mw/Mn of 3.84. $^{13}$C-NMR and $^{1}$H-NMR analysis were performed, and the polyfunctional vinyl aromatic copolymer C contained 39.4 mol % (42.6 wt %) of the structural unit derived from divinylbenzene, 15.9 mol % (17.4 wt %) of the structural unit derived from ethyl vinyl benzene, 25.7 mol % (22.2 wt %) of the structural unit derived from styrene, and 19.1 mol % (17.8 wt %) of the structural unit derived from diisobutylene. Since the content of the crosslinked structural unit (a2) derived from the divinyl aromatic compound represented by Formula (2) was 11.4 mol % (12.3 wt %), the degree of crosslinking was 0.29. In addition, since the content of the structural unit (a1) derived from divinylbenzene having a residual vinyl group contained in the polyfunctional vinyl aromatic copolymer 3C was 28.0 mol % (30.2 wt %), the molar fraction of the vinyl-group-containing structural unit (a1) with respect to the total amount of the structural units (a), (b), and (c) was 0.280.

In addition, as a result of TMA measurement, the cured product had a Tg of 183° C. and a softening temperature of 280° C. or higher.

As a result of TGA measurement, the weight loss at 350° C. was 1.28 wt %. When a sample prepared by dissolving 0.5 g of the polyfunctional vinyl aromatic copolymer 3C in 100 g of toluene was put into a quartz cell, and the Haze (turbidity) thereof was measured using an integrating sphere type light transmittance measuring device using toluene as a reference sample, the Haze value was 0.05.

Comparative Example 1C 320.5 mL of DVB-810 (1.82 mol of a divinylbenzene component and 0.43 mol of an ethyl vinyl benzene component), 0.28 mol (36.9 mL) of n-butyl acetate, and 140 mL of toluene were put into a 1.0 L reaction container, a solution prepared by dissolving 40 mmol of methanesulfonic acid in 0.12 mol (15.7 mL) of n-butyl acetate at 70° C. was added, and the mixture was reacted for 6 hours. After stopping the polymerization solution with calcium hydroxide, filtration was performed using activated alumina as a filtering aid. Then, devolatilization under a reduced pressure was performed at 60° C., and 22.6 g of a polyfunctional vinyl aromatic copolymer C1C was obtained.

The polyfunctional vinyl aromatic copolymer C1C had an Mn of 1,085, an Mw of 12,400, and an Mw/Mn of 11.4, and contained 84.0 mol % (83.8 wt %) of the structural unit derived from divinylbenzene and a total of 16.0 mol % (16.2 wt %) of the structural unit derived from ethyl vinyl benzene. The content of the crosslinked structural unit (a2) was 2.60 mol % (2.59 wt %), the degree of crosslinking was 0.031, the content of the vinyl-group-containing structural unit (a1) was 11.40 mol % (11.37 wt %), and the molar fraction of the vinyl-group-containing structural unit (a1) was 0.114.

In addition, the cured product had a Tg of 82° C., a softening temperature of 93° C., and a weight loss at 350° C. of 8.25 wt %. On the other hand, the compatibility with an epoxy resin was o.

The Haze value of the polyfunctional vinyl aromatic copolymer C1C was 0.02.

Comparative Example 2C 1.5 mol (195.3 g) of divinylbenzene, 0.88 mol (114.7 g) of ethyl vinyl benzene, 12.6 mol (1,314.3 g) of styrene, and 15.0 mol (1,532.0 g) of N-propyl acetate were put into a 5.0 L reaction container, 600 mmol of a boron trifluoride diethyl ether complex was added at 70° C. and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 820.8 g of the copolymer C2C was obtained.

The copolymer C2C had an Mn of 1,490, an Mw of 12,600, and an Mw/Mn of 8.44. The copolymer C2C contained 11.3 mol % (13.5 wt %) of the structural unit derived from divinylbenzene, 5.79 mol % (7.04 wt %) of the structural unit derived from ethyl vinyl benzene, and 82.9 mol % (79.4 wt %) of the structural unit derived from styrene.

The content of the crosslinked structural unit (a2) was 5.86 mol % (7.02 wt %), the degree of crosslinking was 0.52, the content of the vinyl-group-containing structural unit (a1) was 5.41 mol % (6.48 wt %), and the molar fraction of the vinyl-group-containing structural unit (a1) was 0.054.

In addition, the cured product had a Tg of 162° C., a softening temperature of 280° C. or higher, and a weight loss at 350° C. of 1.86 wt %.

The Haze value of the polyfunctional vinyl aromatic copolymer C2C was 0.14.

Comparative Example 3C 2.25 mol (292.9 g) of divinylbenzene, 1.32 mol (172.0 g) of ethyl vinyl benzene, 11.4 mol (1,190.3 g) of styrene, and 15.0 mol (1,532.0 g) of N-propyl acetate were put into a 5.0 L reaction container, 600 mmol of a boron trifluoride diethyl ether complex was added at 70° C. and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 860.8 g of the copolymer C3C was obtained.

The copolymer C3C had an Mn of 2,060, an Mw of 30,700, and an Mw/Mn of 14.9. The copolymer C3C contained 20.92 mol % (24.29 wt %) of the structural unit derived from divinylbenzene, 9.06 mol % (10.68 wt %) of the structural unit derived from ethyl vinyl benzene, and 70.02 mol % (65.03 wt %) of the structural unit derived from styrene.

The content of the crosslinked structural unit (a2) was 11.30 mol % (13.12 wt %), the degree of crosslinking was 0.54, the content of the vinyl-group-containing structural unit (a1) was 9.62 mol % (11.17 wt %), and the molar fraction of the vinyl-group-containing structural unit (a1) was 0.096.

In addition, the cured product was Tg-less, the softening temperature was 280° C. or higher, and the weight loss at 350° C. was 2.11 wt %.

The Haze value of the polyfunctional vinyl aromatic copolymer C3C was 0.17.

Comparative Example 4C 3.1 mol (404.5 g) of divinylbenzene, 1.8 mol (237.6 g) of ethyl vinyl benzene, 7.5 mol (780.7 g) of styrene, and 13.0 mol (1,325.7 g) of N-propyl acetate were put into a 5.0 L reaction container, 193 mmol of a boron trifluoride diethyl ether complex was added at 70° C., and the mixture was reacted for 4 hours. After stopping the polymerization solution with a sodium hydrogen carbonate aqueous solution, an oil layer was washed with pure water three times and devolatilized at 60° C. under a reduced pressure to collect a copolymer. The obtained copolymer was weighed and it was confirmed that 689.2 g of the copolymer C4C was obtained.

The copolymer C4C had an Mn of 2,940, an Mw of 39,500, and an Mw/Mn of 13.4. The copolymer C4C contained 36.8 mol % (40.7 wt %) of the structural unit derived from divinylbenzene, 14.5 mol % (16.3 wt %) of the structural unit derived from ethyl vinyl benzene, and 48.6 mol % (43.0 wt %) of the structural unit derived from styrene.

The content of the crosslinked structural unit (a2) was 20.99 mol % (23.20 wt %), the degree of crosslinking was 0.57, the content of the vinyl-group-containing structural unit (a1) was 15.84 mol % (17.50 wt %), and the molar fraction of the vinyl-group-containing structural unit (a1) was 0.158.

In addition, the cured product was Tg-less, the softening temperature was 280° C. or higher, and the weight loss at 350° C. was 2.23 wt %.

The Haze value of the functional vinyl aromatic copolymer C4C was 0.21.

Example 4C 245 g of cyclohexane, 0.5 g of THF, 10 g of styrene, 40 g of 1,3-butadiene, and 0.10 g of the polyfunctional vinyl aromatic copolymer 1C obtained in Example 1C were put into an autoclave reaction container purged with nitrogen and having an internal volume of 0.5 L. At 25° C., 5 g of a cyclohexane solution containing 10 mg (0.16 mmol) of sec-butyl lithium was added to initiate polymerization. The temperature of the reaction solution increased due to heat of polymerization, and the maximum temperature reached 81° C.

After it was confirmed that the polymerization conversion rate reached 99%, 50 mg of isopropanol was added to stop the polymerization, and 2,6-di-tert-butyl-p-cresol (BHT) was added to the reaction solution. Then, the solvent was removed by steam stripping to obtain a conjugated diene copolymer 4C. 0.5 g of the obtained conjugated diene copolymer 4C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 4C.

Example 5C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.10 g of the polyfunctional vinyl aromatic copolymer 1C obtained in Example 1C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 80° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 5C. 0.5 g of the obtained conjugated diene copolymer 5C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 5C.

Example 6C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.085 g of the polyfunctional vinyl aromatic copolymer 2C obtained in Example 2C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 6C. 0.5 g of the obtained conjugated diene copolymer 6C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 6C.

Example 7C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.10 g of the polyfunctional vinyl aromatic copolymer 1C obtained in Example 1C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 81° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 7C. 0.5 g of the obtained conjugated diene copolymer 7C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 7C.

Example 8C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.085 g of the polyfunctional vinyl aromatic copolymer 2C obtained in Example 2C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 82° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 8C. 0.5 g of the obtained conjugated diene copolymer 8C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 8C.

Example 9C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.070 g of the polyfunctional vinyl aromatic copolymer 3C obtained in Example 3C was then added over 30 minutes to prepare a polyfunctional anionic polymerization initiator. The prepared polyfunctional anionic polymerization initiator was soluble in cyclohexane, and no gel formation was observed. 10 g of styrene and 40 g of 1,3-butadiene from which impurities were removed in advance were added to initiate polymerization. The temperature of the reaction solution increased due to heat of polymerization, and the maximum temperature reached 78° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 9C. 0.5 g of the obtained conjugated diene copolymer 9C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 1C shows physical properties of the conjugated diene copolymer 9C.

Comparative Example 5C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.1 g of the polyfunctional vinyl aromatic copolymer C1C obtained in Comparative Example 1C was then added over 30 minutes to prepare a polyfunctional anionic polymerization initiator. The prepared polyfunctional anionic polymerization initiator was partially soluble in cyclohexane, but gel formation was observed. 10 g of styrene and 40 g of 1,3-butadiene from which impurities were removed in advance were added to initiate polymerization. The temperature of the reaction solution increased due to heat of polymerization, and the maximum temperature reached 84° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer CSC. 0.5 g of the obtained conjugated diene copolymer C5C was dissolved in 100 mL of toluene, colored by adding 1.0 g of a 0.2 wt % sudan III toluene solution, and filtered with a 0.2 μm PTFE membrane filter, and when the membrane filter after filtration was observed under a stereomicroscope, it was confirmed that a microgel was formed. Table 1C shows physical properties of the conjugated diene copolymer C5C.

Comparative Example 6C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.08 g of the polyfunctional vinyl aromatic copolymer C2C obtained in Comparative Example 2C was then added over 30 minutes to prepare a polyfunctional anionic polymerization initiator. The prepared polyfunctional anionic polymerization initiator was generally soluble in cyclohexane, but gel formation was also observed visually. 10 g of styrene and 40 g of 1,3-butadiene from which impurities were removed in advance were added to initiate polymerization. The temperature of the reaction solution increased due to heat of polymerization, and the maximum temperature reached 83° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C6C. 0.5 g of the obtained conjugated diene copolymer C6C was dissolved in 100 mL of toluene, colored by adding 1.0 g of a 0.2 wt % sudan III toluene solution, and filtered with a 0.2 μm PTFE membrane filter, and when the membrane filter after filtration was observed under a stereomicroscope, it was confirmed that a microgel was formed. Table 1C shows physical properties of the conjugated diene copolymer C6C.

Comparative Example 7C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.10 g of the polyfunctional vinyl aromatic copolymer C3C obtained in Comparative Example 3C was then added over 30 minutes to prepare a polyfunctional anionic polymerization initiator. The prepared polyfunctional anionic polymerization initiator was soluble in cyclohexane, but gel formation was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer C7C. 0.5 g of the obtained conjugated diene copolymer C7C was dissolved in 100 mL of toluene, colored by adding 1.0 g of a 0.2 wt % sudan III toluene solution, and filtered with a 0.2 μm PTFE membrane filter, and when the membrane filter after filtration was observed under a stereomicroscope, it was confirmed that a microgel was formed. Table 1C shows physical properties of the conjugated diene copolymer C7C.

Comparative Example 8C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.08 g of the polyfunctional vinyl aromatic copolymer C4C obtained in Comparative Example 4C was then added over 30 minutes to prepare a polyfunctional anionic polymerization initiator. The prepared polyfunctional anionic polymerization initiator was partially soluble in cyclohexane, but gel formation was observed. 10 g of styrene and 40 g of 1,3-butadiene from which impurities were removed in advance were added to initiate polymerization. The temperature of the reaction solution increased due to heat of polymerization, and the maximum temperature reached 83° C.

After it was confirmed that the polymerization conversion rate reached 99%, 50 mg (0.83 mmol) of isopropanol was added to stop the polymerization, and BHT was added to the reaction solution. Then, the solvent was removed by steam stripping to obtain a conjugated diene copolymer C8C. 0.5 g of the obtained conjugated diene copolymer C8C was dissolved in 100 mL of toluene, colored by adding 1.0 g of a 0.2 wt % sudan III toluene solution, and filtered with a 0.2 μm PTFE membrane filter, and when the membrane filter after filtration was observed under a stereomicroscope, it was confirmed that a microgel was formed. Table 1C shows physical properties of the conjugated diene copolymer C8C.

TABLE 1C

| | Polyfunctional vinyl aromatic copolymer | Modifying agent | Conjugated diene copolymer | Mw (10,000) | Vinyl bond amount (%) | Mooney viscosity | Haze |
|---|---|---|---|---|---|---|---|
| Example 4C | 1C | | 4C | 43 | 53 | 49 | 0.01 |
| Example 5C | 1C | | 5C | 45 | 57 | 51 | 0.02 |
| Example 6C | 2C | | 6C | 47 | 61 | 48 | 0.01 |
| Example 7C | 1C | BTESPA | 7C | 44 | 56 | 55 | 0.03 |
| Example 8C | 2C | BTESPA | 8C | 47 | 57 | 59 | 0.05 |
| Example 9C | 3C | BTESPA | 9C | 49 | 54 | 49 | 0.08 |
| Comparative Example 5C | C1C | | C5C | 28 | 56 | 31 | 0.21 |
| Comparative Example 6C | C2C | | C6C | 37 | 67 | 32 | 1.56 |
| Comparative Example 7C | C3C | | C7C | 34 | 66 | 33 | 1.92 |
| Comparative Example 8C | C4C | | C8C | 35 | 68 | 31 | 3.32 |

Example 10C

The conjugated diene copolymer 4C (copolymer rubber) synthesized in Example 4C, a process oil, carbon black, zinc oxide, stearic acid and an antioxidant were added, and kneaded using a Labo Plastomill at 155° C. and 60 rpm for 4 minutes.

Sulfur and a vulcanization accelerator were added to the kneaded product obtained by the above kneading, and the mixture was kneaded using a Labo Plastomill at 70° C. and 60 rpm for 1 minute and vulcanized to obtain a crosslinked rubber 10C.

Table 2C shows formulation proportions of additives. In addition, Table 3C shows physical properties of the crosslinked rubber 10C.

TABLE 2C

| | |
|---|---|
| Copolymer rubber | 100.0 |
| Process oil | 37.5 |
| Silica | 65.0 |
| Carbon black | 5.0 |
| Zinc oxide | 3.0 |
| Stearic acid | 1.0 |
| Antioxidant | 1.0 |
| Sulfur | 1.8 |
| Vulcanization accelerator | 1.5 |

Here, additives used are as follows.

Process oil: Diana Process Oil AC-12 commercially available from Idemitsu Kosan Co., Ltd.

Silica: ULTRASIL VN3 commercially available from Degussa AG

Carbon black: Niteron #300 commercially available from Nippon Steel Carbon Co., Ltd.

Zinc oxide: Zinc oxide No. 1 commercially available from Mitsui Mining & Smelting Co., Ltd.

Stearic acid: commercially available from NOF Corporation

Antioxidant: NOCCELER NS commercially available from Ouchi Shinko Chemical Industrial Co., Ltd.

Sulfur: sulfur powder commercially available from Tsurumi Chemical Industry Co., Ltd.

Vulcanization accelerator: N-tert-butylbenzothiazole-2-sulfenamide

Examples 11C to 15C, and Comparative Examples 9C to 12C

Crosslinked rubbers 11C to 15C, and C9C to C12C were obtained in the same manner as in Example 10C except that the conjugated diene copolymers 5C to 9C, and C5C to C8C synthesized in the above examples and comparative examples were used in place of the conjugated diene copolymer 4C.

Table 3C shows the types of the conjugated diene copolymers used and physical properties of the obtained crosslinked rubbers 11C to 15C, and C9C to C12C.

TABLE 3C

| | Conjugated diene copolymer | Crosslinked rubber | Bound rubber amount (%) | Tensile strength index | Wear resistance index |
|---|---|---|---|---|---|
| Example 10C | 4C | 10C | 24 | 100 | 100 |
| Example 11C | 5C | 11C | 25 | 106 | 107 |
| Example 12C | 6C | 12C | 26 | 113 | 111 |
| Example 13C | 7C | 13C | 65 | 117 | 118 |
| Example 14C | 8C | 14C | 72 | 119 | 122 |
| Example 15C | 9C | 15C | 76 | 122 | 119 |
| Comparative Example 9C | C5C | C9C | 15 | 87 | 81 |
| Comparative Example 10C | C6C | C10C | 14 | 85 | 84 |
| Comparative Example 11C | C7C | C11C | 13 | 89 | 80 |
| Comparative Example 12C | C8C | C12C | 14 | 83 | 81 |

In Table 3C, it was found that the rubber crosslinked material of the present invention using the polyfunctional vinyl aromatic copolymer of the present invention had the same or higher dispersibility of silica and adhesion at the interface as or than when divinylbenzene which is a known branching agent was used, and in the vulcanized rubber, the tensile strength and wear resistance were excellent.

Example 16C 46.49 g of DVB-630 (0.225 mol of a divinylbenzene component and 0.132 mol of an ethyl vinyl benzene component), 53.33 g (0.512 mol) of styrene, 61.95 g (0.631 mol) of 2-methyl-1-hexene, 60 mmol (6.90 mL) of N-propyl acetate, and 48.55 g (0.527 mol) of toluene were put into a 500 mL reaction container, 10.0 mmol of a boron trifluoride diethyl ether complex (1.26 mL) was added at 70° C., and the mixture was reacted for 2.0 hours. After stopping the polymerization solution with a sodium hydrogen carbonate aqueous solution, an oil layer was washed with pure water three times and devolatilized at 60° C. under a reduced pressure, a copolymer was collected, and 64.8 g of a polyfunctional vinyl aromatic copolymer 16C was obtained.

The obtained polyfunctional vinyl aromatic copolymer 16C had an Mn of 1,310, an Mw of 5,070, and an Mw/Mn of 3.87. $^{13}C$-NMR and $^{1}H$-NMR analysis were performed, and the polyfunctional vinyl aromatic copolymer J contained 28.0 mol % (32.2 wt %) of the structural unit derived from divinylbenzene, 12.2 mol % (14.2 wt %) of the structural unit derived from ethyl vinyl benzene, 32.5 mol % (35.3 wt %) of the structural unit derived from styrene, and 24.5 mol % (21.2 wt %) of the structural unit derived from 2-methyl-1-hexene.

Since the content of the crosslinked structural unit (a2) derived from the divinyl aromatic compound represented by Formula (2) was 8.1 mol % (9.3 wt %), the degree of crosslinking was 0.29. In addition, since the content of the structural unit (a1) derived from divinylbenzene having a residual vinyl group contained in the polyfunctional vinyl aromatic copolymer J was 19.9 mol % (22.8 wt %), the molar fraction of the vinyl-group-containing structural unit (a1) with respect to the total amount of the structural units (a), (b), and (c) was 0.199.

In addition, as a result of TMA measurement, the cured product had a Tg of 168° C. and a softening temperature of 280° C. or higher.

As a result of TGA measurement, the weight loss at 350° C. was 1.41 wt %. When a sample prepared by dissolving 0.5 g of the polyfunctional vinyl aromatic copolymer 16C in 100 g of toluene was put into a quartz cell, and the Haze (turbidity) thereof was measured using an integrating sphere type light transmittance measuring device using toluene as a reference sample, the Haze value was 0.04.

Example 17C 46.49 g of DVB-630 (0.225 mol of a divinylbenzene component and 0.132 mol of an ethyl vinyl benzene component), 53.33 g (0.512 mol) of styrene, 53.10 g (0.631 mol) of 2-methyl-1-pentene, 60 mmol (6.90 mL) of N-propyl acetate, and 48.55 g (0.527 mol) of toluene were put into a 500 mL reaction container, 10.0 mmol of a boron trifluoride diethyl ether complex (1.26 mL) was added at 70° C., and the mixture was reacted for 2.0 hours. After stopping the polymerization solution with a sodium hydrogen carbonate aqueous solution, an oil layer was washed with pure water three times and devolatilized at 60° C. under a reduced pressure to collect a copolymer, and 61.5 g of a polyfunctional vinyl aromatic copolymer 17C was obtained.

The obtained polyfunctional vinyl aromatic copolymer 17C had an Mn of 1,280, an Mw of 5,260, and an Mw/Mn of 4.11. $^{13}$C-NMR and $^{1}$H-NMR analysis were performed, and the polyfunctional vinyl aromatic copolymer 17C contained 26.5 mol % (31.7 wt %) of the structural unit derived from divinylbenzene, 11.3 mol % (13.8 wt %) of the structural unit derived from ethyl vinyl benzene, 35.3 mol % (33.8 wt %) of the structural unit derived from styrene, and 26.8 mol % (20.8 wt %) of the structural unit derived from 2-methyl-1-pentene.

Since the content of the crosslinked structural unit (a2) derived from the divinyl aromatic compound represented by Formula (2) was 7.2 mol % (8.6 wt %), the degree of crosslinking was 0.27. In addition, since the content of the structural unit (a1) derived from divinylbenzene having a residual vinyl group contained in the polyfunctional vinyl aromatic copolymer B was 19.3 mol % (23.1 wt %), the molar fraction of the vinyl-group-containing structural unit (a1) with respect to the total amount of the structural units (a), (b), and (c) was 0.193.

In addition, as a result of TMA measurement, the cured product had a Tg of 171° C. and a softening temperature of 280° C. or higher.

As a result of TGA measurement, the weight loss at 350° C. was 1.38 wt %. When a sample prepared by dissolving 0.5 g of the polyfunctional vinyl aromatic copolymer 17C in 100 g of toluene was put into a quartz cell, and the Haze (turbidity) thereof was measured using an integrating sphere type light transmittance measuring device using toluene as a reference sample, the Haze value was 0.03.

Example 18C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.085 g of the polyfunctional vinyl aromatic copolymer 16C obtained in Example 16C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 82° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 18C. 0.5 g of the obtained conjugated diene copolymer 18C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 4C shows physical properties of the conjugated diene copolymer 18C.

Example 19C 200 g of cyclohexane and 0.5 g of THF were put into an autoclave reaction container purged with nitrogen, 5 g of a cyclohexane solution containing 10 mg (0.16 mmol) of n-butyllithium as a pure content was added at 50° C., and 45 g of a cyclohexane solution containing 0.085 g of the polyfunctional vinyl aromatic copolymer 17C obtained in Example 17C was then added over 30 minutes to prepare a polyfunctional anionic polymerization initiator. The prepared polyfunctional anionic polymerization initiator was soluble in cyclohexane and no gel was observed. 10 g of styrene and 40 g of 1,3-butadiene from which impurities were removed in advance were added to initiate polymerization. The temperature of the reaction solution increased due to heat of polymerization, and the maximum temperature reached 82° C. After the polymerization reaction was completed, 21 mmol of BTESPA as a modifying agent was put into the reaction container to cause a modification reaction, and the modification reaction was performed under a temperature condition of 80° C. for 5 minutes to obtain a polymer solution.

After it was confirmed that the polymerization conversion rate reached 99%, 50 mg (0.83 mmol) of isopropanol was added to stop the polymerization, BHT was added to the reaction solution. Then, the solvent was removed by steam stripping to obtain a conjugated diene copolymer 19C. 0.5 g of the obtained conjugated diene copolymer 19C was dissolved in 100 mL of toluene and colored by adding 1.0 g of a 0.2 wt % sudan III toluene solution, and filtered with a 0.2 μm PTFE membrane filter, and when the membrane filter after filtration was observed under a stereomicroscope, it was confirmed that no microgel was formed. Table 4C shows physical properties of the conjugated diene copolymer 19C.

TABLE 4C

| | Polyfunctional vinyl aromatic copolymer | Modifying agent | Conjugated diene copolymer | Mw (10,000) | Vinyl bond amount (%) | Mooney viscosity | Haze |
|---|---|---|---|---|---|---|---|
| Example 18C | 16C | BTESPA | 18C | 42 | 51 | 48 | 0.03 |
| Example 19C | 17C | BTESPA | 19C | 41 | 56 | 49 | 0.04 |

INDUSTRIAL APPLICABILITY

The polyfunctional vinyl aromatic copolymer of the present invention can be used as a raw material for the conjugated diene copolymer. In addition, since the crosslinked rubber composition in which the conjugated diene copolymer contains a filler and is crosslinked has excellent dispersibility of the filler and excellent mechanical strength and wear resistance, it is beneficial as an elastomer material such as a tire (particularly tire tread), a base isolation rubber, a rubber hose, a rubber roller, and a footwear material.

In addition, the present invention can be applied for molding materials, resin modifiers, and the like. In the fields such as electrical and electronic industries, and space and aircraft industries, the present invention can be provided as dielectric materials, insulating materials, heat-resistant materials, structural materials, and the like. In addition, the film and sheet coated with the curable resin composition containing the polyfunctional vinyl aromatic copolymer of the present invention are preferably used in plastic optical components, touch panels, flat displays, film liquid crystal elements, and the like. The polyfunctional vinyl aromatic copolymer of the present invention can be used as a modifier for modifying characteristics such as heat resistance, dielectric characteristics and optical characteristics of a thermoplastic resin or a curable resin composition used as a main material for films, sheets and prepregs. In addition, the curable resin composition containing the polyfunctional vinyl aromatic copolymer of the present invention as a main material can be used by being processed into films, sheets and prepregs. In addition, the curable resin composition containing the polyfunctional vinyl aromatic copolymer of the present invention can be used for various optical elements such as an optical waveguide and an optical lens.

The invention claimed is:

1. A polyfunctional vinyl aromatic copolymer, comprising 5 mol % or more and 35 mol % or less of a structural unit (a) derived from a divinyl aromatic compound, 5 mol % or more and 25 mol % or less of a structural unit (b) derived from a monovinyl aromatic compound, and 40 mol % or more and 90 mol % or less of a structural unit (c) derived from a cycloolefin-based monomer having an aromatic condensed ring structure, in which at least some of the structural units (a) are a vinyl-group-containing structural unit (a1) represented by the following Formula (1):

(1)

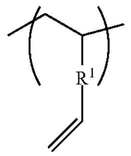

in the formula, R1 represents an aromatic hydrocarbon group having 6 to 30 carbon atoms, wherein the molar fraction of the vinyl-group-containing structural unit (a1) with respect to the total amount of the structural units (a), (b) and (c) is within a range of 0.01 to 0.30, wherein the cycloolefin-based monomer is at least one monomer selected from the group consisting of indene compounds, benzofuran compounds, and benzothiophene compounds, and wherein, the molecular weight distribution (Mw/Mn) represented by the ratio of the weight average molecular weight Mw to the number average molecular weight Mn is 2.89 to 3.88.

2. A conjugated diene copolymer obtained by copolymerizing the polyfunctional vinyl aromatic copolymer (A) according to claim 1 with a conjugated diene compound (B) or with a conjugated diene compound (B) and an aromatic vinyl compound (C).

3. The conjugated diene copolymer according to claim 2, comprising 0.001 to 6 weight % of a structural unit (A1) derived from the polyfunctional vinyl aromatic copolymer, 29 to 99.999 weight % of a structural unit (B1) derived from the conjugated diene compound, and 0 to 70 weight % of a structural unit (C1) derived from the aromatic vinyl compound.

4. The conjugated diene copolymer according to claim 2, wherein a modifying agent is additionally reacted with a polymerization active terminal of the conjugated diene copolymer.

5. A conjugated diene copolymer composition, comprising 0.5 to 200 parts by weight of at least one reinforcing filling agent selected from the group consisting of silica inorganic filling agents, metal oxides, metal hydroxides and carbon black with respect to 100 parts by weight of the conjugated diene copolymer according to claim 2.

6. A polyfunctional vinyl aromatic copolymer, comprising 0.5 mol % or more and 40 mol % or less of a structural unit (a) derived from a divinyl aromatic compound and 60 mol % or more and 99.5 mol % or less of a structural unit (b) derived from a monovinyl aromatic compound, in which at least some of the structural units (a) are a crosslinked structural unit (a2) represented by the following Formula (2) and a vinyl-group-containing structural unit (a1) represented by the following Formula (1):

(2)

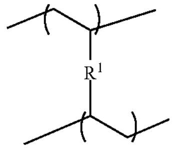

(1)

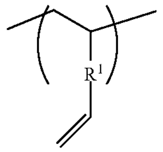

in the formula, R1's independently represents an aromatic hydrocarbon group having 6 to 30 carbon atoms, wherein the molar fraction of the crosslinked structural unit (a2) with respect to the structural unit (a) is within a range of 0.05 to 0.50, the molar fraction of the vinyl-group-containing structural unit (a1) with respect to the total amount of the structural units (a) and (b) is within a range of 0.001 to 0.085, the number average molecular weight Mn of the polyfunctional vinyl aromatic copolymer is 1,000 to 50,000, and the molecular weight distribution (Mw/Mn) represented by the ratio of the weight average molecular weight Mw to the number average molecular weight Mn is 8.0 or less.

7. The polyfunctional vinyl aromatic copolymer according to claim 6, wherein the Haze value of a solution prepared by dissolving 0.5 g of the polyfunctional vinyl aromatic copolymer in 100 g of toluene is 0.1 or less.

8. The polyfunctional vinyl aromatic copolymer according to claim 6, wherein the monovinyl aromatic compound is at least one monomer selected from the group consisting of styrene, vinyl naphthalene, vinyl biphenyl, m-methylstyrene, p-methylstyrene, o,p-dimethylstyrene, m-ethylvinylbenzene, and p-ethylvinylbenzene.

9. A method for manufacturing the polyfunctional vinyl aromatic copolymer according to claim 6, comprising polymerizing polymerization raw materials including a divinyl aromatic compound and a monovinyl aromatic compound in a homogeneous solvent containing the polymerization raw materials that includes the divinyl aromatic compound and a monovinyl aromatic compound dissolved in a solvent with a dielectric constant of 2.0 to 15.0 at a temperature of 20° C. to 60° C. in the presence of a Lewis acid catalyst.

10. A polyfunctional vinyl aromatic copolymer, comprising 0.5 mol % or more and 75 mol % or less of a structural unit (a) derived from a divinyl aromatic compound, 5.0 mol % or more and 75 mol % or less of a structural unit (b) derived from a monovinyl aromatic compound having no substituent at the α position, and 5.0 mol % or more and 75 mol % or less of a structural unit (c) derived from an α,α-disubstituted olefin compound, in which at least some of the structural units (a) are a crosslinked structural unit (a2) represented by the following Formula (2) and a vinyl-group-containing structural unit (a1) represented by the following Formula (1):

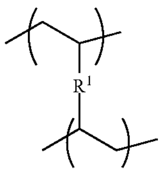

(2)

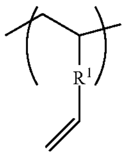

(1)

in the formulas, R1's independently represent an aromatic hydrocarbon group having 6 to 30 carbon atoms, wherein the molar fraction of the crosslinked structural unit (a2) with respect to the structural unit (a) is within a range of 0.05 to 0.60, and the molar fraction of the vinyl-group-containing structural unit (a1) with respect to the total amount of the structural units (a), (b) and (c) is within a range of 0.001 to 0.60, and the number average molecular weight Mn of the polyfunctional vinyl aromatic copolymer is 300 to 50,000, and the molecular weight distribution (Mw/Mn) represented by the ratio of the weight average molecular weight Mw to the number average molecular weight Mn is 10.0 or less, and wherein the α,α-disubstituted olefin compound is at least one monomer selected from the group consisting of isobutylene, diisobutylene, 2-methyl-1-butene, 2-methyl-1-pentene, 1-methyl-1-cyclopentene, 2-methyl-1-hexene, 1-methyl-1-cyclohexene, 2-methyl-1-heptene, 2-methyl-1-octene, 2-methyl-1-nonene, 2-methyl-1-decene, 2-methyl-1-dodecene, 2-methyl-1-tetradecene, 2-methyl-1-hexadecene, 2-methyl-1-octadecene, 2-methyl-1-eicosene, 2-methyl-1-docosene, 2-methyl-1-tetracosene, and α-methylstyrene.

11. The polyfunctional vinyl aromatic copolymer according to claim 10, wherein the monovinyl aromatic compound having no substituent at the α position is at least one monomer selected from the group consisting of styrene, vinyl naphthalene, vinyl biphenyl, m-methylstyrene, p-methylstyrene, o,p-dimethylstyrene, m-ethylvinylbenzene, and p-ethylvinylbenzene.

12. A method for manufacturing the polyfunctional vinyl aromatic copolymer according to claim 10, comprising polymerizing polymerization raw materials including a divinyl aromatic compound, a monovinyl aromatic compound having no substituent at the α position, and an α,α-disubstituted olefin compound in a homogeneous solvent containing the polymerization raw materials that includes the divinyl aromatic compound, monovinyl aromatic compound having no substituent at the α position, and α,α-disubstituted olefin compound dissolved in a solvent with a dielectric constant of 2.0 to 15.0 at a temperature of 0° C. to 120° C. in the presence of a Lewis acid catalyst.

* * * * *